US012350812B2

(12) United States Patent
Hoppe et al.

(10) Patent No.: US 12,350,812 B2
(45) **Date of Patent: *Jul. 8, 2025**

(54) STORAGE DEVICE SYSTEM

(71) Applicants: Milwaukee Electric Tool Corporation, Brookfield, WI (US); Keter Plastic LTD., Herzelyia (IL)

(72) Inventors: Christopher S. Hoppe, Cedarburg, WI (US); Matthew Vargo, Milwaukee, WI (US); Yaron Brunner, Kibbutz Gvat (IL)

(73) Assignees: Milwaukee Electronic Tool Corporation, Brookfield, WI (US); Keter Plastic LTD., Herzelyia (IL)

( * ) Notice: Subject to any disclaimer, the term of this patent is extended or adjusted under 35 U.S.C. 154(b) by 182 days.

This patent is subject to a terminal disclaimer.

(21) Appl. No.: 17/667,216

(22) Filed: Feb. 8, 2022

(65) Prior Publication Data

US 2022/0161413 A1 May 26, 2022

Related U.S. Application Data

(63) Continuation of application No. 15/375,492, filed on Dec. 12, 2016, now Pat. No. 11,267,119.

(60) Provisional application No. 62/267,071, filed on Dec. 14, 2015.

(51) Int. Cl.
*B25H 3/02* (2006.01)

(52) U.S. Cl.
CPC .................................... *B25H 3/022* (2013.01)

(58) Field of Classification Search
CPC .... B25H 3/022; B25H 3/021; B65D 21/0223; B65D 21/0217
USPC .................................................. 206/511, 509
See application file for complete search history.

(56) References Cited

U.S. PATENT DOCUMENTS

| | | | |
|---|---|---|---|
| 2,042,387 | A | 5/1936 | Cobb |
| 2,430,200 | A | 11/1947 | Wilson |
| 2,970,358 | A | 2/1961 | Elsner |
| 3,117,692 | A | 1/1964 | Carpenter et al. |

(Continued)

FOREIGN PATENT DOCUMENTS

| | | |
|---|---|---|
| CN | 2608238 | 3/2004 |
| CN | 200947356 | 9/2007 |

(Continued)

OTHER PUBLICATIONS

"Blitz Box—Portable Storage Box / Shelf," The Green Head Finds Cool New Stuff, https://www.thegreenhead.com/2013/03/blitz-box-portable-storage-box-shelf.php, Available at least as early as Jun. 11, 2019, 8 pages.

(Continued)

*Primary Examiner* — Stephen J Castellano
(74) *Attorney, Agent, or Firm* — Reinhart Boerner Van Deuren s.c.

(57) ABSTRACT

A storage device system includes a storage case having a base and a cover coupled to the base, and a plurality of insertable bins removably positioned within an interior of the base. The plurality of insertable bins includes a first bin having a first height and a set of second bins each having a second height. The set of second bins is configured to be stackable and have a stacked height when stacked. A depth of the interior of the base, the first height, and the stacked height are equal.

18 Claims, 20 Drawing Sheets

(56) References Cited

U.S. PATENT DOCUMENTS 3,225,865 A 12/1965 Downey
3,424,334 A 1/1969 Goltz
3,506,321 A 4/1970 Hampel
3,743,372 A 7/1973 Ruggerone
D232,798 S 9/1974 Roche et al.
3,935,613 A 2/1976 Kaneko
3,974,898 A 8/1976 Tullis et al.
4,168,076 A 9/1979 Johnson
4,971,201 A 11/1990 Sathre
5,035,445 A 7/1991 Poulin
D319,016 S 8/1991 Kahl
5,098,235 A 3/1992 Svetlik et al.
D325,324 S 4/1992 Kahl
5,105,947 A 4/1992 Wise
D326,815 S 6/1992 Meisner et al.
5,240,264 A 8/1993 Williams
D340,167 S 10/1993 Kahl
5,301,829 A 4/1994 Chrisco
D352,208 S 11/1994 Brookshire
5,429,260 A 7/1995 Vollers
D361,511 S 8/1995 Dickinson et al.
5,538,213 A 7/1996 Brown
5,595,228 A 1/1997 Meisner et al.
5,608,603 A 3/1997 Su
5,628,443 A 5/1997 Deutsch
D395,533 S 6/1998 Morison et al.
5,797,617 A 8/1998 Lin
5,890,613 A 4/1999 Williams
5,951,037 A 9/1999 Hsieh
D415,393 S 10/1999 Kei
5,988,473 A 11/1999 Hagan et al.
D420,860 S 2/2000 Golichowski et al.
6,050,660 A 4/2000 Gurley
6,085,925 A 7/2000 Chung
6,109,627 A 8/2000 Be
6,176,559 B1 1/2001 Tiramani et al.
D437,669 S 2/2001 Blason et al.
6,305,498 B1 10/2001 Itzkovitch
6,347,847 B1 2/2002 Tiramani et al.
6,367,631 B1 4/2002 Steigerwald
6,371,320 B2 4/2002 Sagol
D456,972 S 5/2002 Blason et al.
6,431,580 B1 8/2002 Kady
6,547,347 B2 4/2003 Saito
6,601,930 B2 8/2003 Tiramani et al.
6,619,772 B2 9/2003 Dierbeck
6,637,707 B1 10/2003 Gates
6,641,013 B2 11/2003 Oise
6,945,546 B2 9/2005 Guirlinger
6,948,691 B2 9/2005 Brock et al.
6,983,946 B2 1/2006 Sullivan et al.
7,044,484 B2 5/2006 Wang
7,066,475 B2 6/2006 Barnes
D525,789 S 8/2006 Hosking
D527,225 S 8/2006 Krieger et al.
7,147,243 B2 12/2006 Kady
D536,580 S 2/2007 Krieger et al.
7,263,742 B2 9/2007 Valentini
7,367,571 B1 5/2008 Nichols
7,503,569 B2 3/2009 Duvigneau
7,658,887 B2 2/2010 Hovatter
7,779,764 B2 8/2010 Naidu et al.
7,780,026 B1 8/2010 Zuckerman
7,841,144 B2 11/2010 Pervan
D630,851 S 1/2011 Landau et al.
8,028,845 B2 10/2011 Himes
D649,350 S 11/2011 Shitrit
D653,832 S 2/2012 Vilkomirski et al.
8,132,819 B2 3/2012 Landau
8,177,463 B2 5/2012 Walker
D661,858 S 6/2012 Lifshitz et al.
8,191,910 B2 6/2012 Landau et al.
D663,952 S 7/2012 Crevling, Jr. et al.
D664,354 S 7/2012 Crevling, Jr. et al.
D668,869 S 10/2012 Yamamoto et al.
D674,605 S 1/2013 Vilkomirski et al.
8,454,033 B2 6/2013 Tsai
8,459,495 B2 6/2013 Koenig
8,505,729 B2 8/2013 Sosnovsky et al.
8,567,796 B2 10/2013 Bar-Erez et al.
8,657,307 B2 2/2014 Lifshitz
8,677,661 B2 3/2014 Michels
D701,696 S 4/2014 Shitrit et al.
8,689,396 B2 4/2014 Wolfe
8,714,355 B2 5/2014 Huang
8,740,010 B1 6/2014 Page
8,813,960 B2 8/2014 Fjelland
8,875,888 B2 11/2014 Koenig
8,979,100 B2 3/2015 Bensman et al.
8,985,922 B2 3/2015 Neumann
D738,105 S 9/2015 Shitrit
D738,106 S 9/2015 Shitrit
9,132,543 B2 9/2015 Bar-Erez
D753,394 S 4/2016 Brunner
D753,395 S 4/2016 Brunner
D753,396 S 4/2016 Brunner
9,375,835 B1 6/2016 Lin
D765,974 S 9/2016 Tonelli et al.
D770,179 S 11/2016 Menirom
9,506,489 B2 * 11/2016 Ko .......................... F16B 12/24
9,511,491 B2 12/2016 Brunner
D777,426 S 1/2017 Dahl
9,566,990 B2 2/2017 Bar-Erez
D784,089 S 4/2017 Furneaux et al.
9,616,562 B2 4/2017 Hoppe
9,643,629 B2 5/2017 Bar-Erez et al.
D790,221 S 6/2017 Yahav et al.
9,701,443 B2 7/2017 Wang
9,725,209 B1 8/2017 Ben-Gigi
D803,631 S 11/2017 Min et al.
D806,483 S 1/2018 Stanford et al.
9,872,562 B2 1/2018 Brunner
D814,187 S 4/2018 Caglar
D815,831 S 4/2018 Tonelli
D816,334 S 5/2018 Brunner
D826,510 S 8/2018 Brunner
D828,671 S 9/2018 Cope et al.
D831,352 S 10/2018 Brunner
10,106,180 B2 10/2018 Bar-Erez et al.
D833,744 S 11/2018 Yahav et al.
D836,995 S 1/2019 Carey et al.
D839,681 S 2/2019 Evron et al.
D837,515 S 4/2019 Shpitzer
D845,080 S 4/2019 Jacobsen
D845,081 S 4/2019 Jacobsen
10,286,542 B2 5/2019 Wolle et al.
D857,387 S 8/2019 Shpitzer
10,434,638 B1 10/2019 Tsai
D871,013 S 12/2019 Liu
D873,085 S 1/2020 DeFrancia
10,583,962 B2 * 3/2020 Brunner ................. A45C 7/005
D880,252 S 4/2020 Jacobsen
D880,951 S 4/2020 Jacobsen
D883,752 S 5/2020 Carey et al.
D887,788 S 6/2020 Meda et al.
D888,422 S 6/2020 Yang
D888,503 S 6/2020 Meda et al.
D891,193 S 6/2020 Stanford et al.
D891,195 S 7/2020 Zhou
D891,875 S 8/2020 Olson
D892,565 S 8/2020 Astle et al.
10,750,833 B2 8/2020 Burchia
D895,375 S 9/2020 Hurley, Jr.
D895,966 S 9/2020 Brunner et al.
D895,967 S 9/2020 Brunner et al.
D896,517 S 9/2020 Brunner et al.
D896,518 S 9/2020 Brunner et al.
10,981,696 B2 * 4/2021 Brunner ................... A45C 5/14
2002/0000440 A1 1/2002 Sagal et al.
2002/0125072 A1 9/2002 Levy
2002/0171228 A1 11/2002 Kady
2003/0094393 A1 5/2003 Sahm, III
2003/0115715 A1 6/2003 Valentini
2003/0139080 A1 7/2003 Lafragette et al.

(56) References Cited

U.S. PATENT DOCUMENTS

2003/0146589 A1 8/2003 Jarko et al.
2003/0184034 A1 10/2003 Pfeiffer
2003/0205877 A1 11/2003 Verna et al.
2004/0103494 A1 6/2004 Valentini
2004/0195793 A1 10/2004 Sullivan et al.
2004/0206656 A1 10/2004 Dubois et al.
2005/0062244 A1 3/2005 Guirlinger
2005/0104308 A1 5/2005 Barnes
2005/0139745 A1* 6/2005 Liao .................... G06F 1/1601 248/225.21
2006/0006770 A1 1/2006 Valentini
2006/0027475 A1 2/2006 Gleason et al.
2006/0038367 A9 2/2006 Ferraro
2006/0119060 A1 6/2006 Sullivan et al.
2006/0186624 A1 8/2006 Kady
2006/0254946 A1 11/2006 Becklin
2007/0068757 A1 3/2007 Tan
2007/0090616 A1 4/2007 Tompkins
2007/0138041 A1 6/2007 Welsh
2007/0145700 A1 6/2007 Ambrose et al.
2007/0194543 A1* 8/2007 Duvigneau .............. A45C 5/14 280/47.26
2008/0010492 A1 5/2008 Pervan
2008/0115312 A1 5/2008 Dipasquale et al.
2008/0121547 A1 5/2008 Dur et al.
2008/0134607 A1 6/2008 Pervan
2008/0169739 A1 7/2008 Goldenberg
2008/0271280 A1 11/2008 Tiede et al.
2008/0277221 A1 11/2008 Josefson
2008/0308369 A1 12/2008 Louis
2009/0026901 A1 1/2009 Nies, III et al.
2009/0071990 A1 3/2009 Jardine et al.
2009/0145790 A1 6/2009 Panosian
2009/0145866 A1 6/2009 Panosian et al.
2009/0145913 A1 6/2009 Panosian et al.
2009/0178946 A1 7/2009 Patstone et al.
2009/0236482 A1 9/2009 Winig et al.
2010/0052276 A1 3/2010 Brunner
2010/0139566 A1 6/2010 Lopuszanski
2010/0147642 A1 6/2010 Andochick
2010/0219193 A1 9/2010 Becklin
2011/0073516 A1 3/2011 Zelinskiy
2011/0139665 A1 6/2011 Madsen
2011/0155613 A1* 6/2011 Koenig .............. B65D 21/0223 206/503
2011/0174939 A1 7/2011 Taylor
2011/0181008 A1 7/2011 Bensman
2011/0220531 A1 9/2011 Meether et al.
2011/0260588 A1 10/2011 Lin
2012/0160886 A1 6/2012 Henny et al.
2012/0180250 A1 7/2012 Ricklefsen et al.
2012/0207571 A1 8/2012 Scott
2012/0292213 A1 11/2012 Brunner
2012/0326406 A1 12/2012 Lifshitz
2013/0024468 A1 1/2013 Kocsis
2013/0031731 A1 2/2013 Hess
2013/0031732 A1 2/2013 Hess et al.
2013/0068903 A1 3/2013 O'Keene
2013/0121783 A1 5/2013 Kelly
2013/0127129 A1 5/2013 Bensman et al.
2013/0146551 A1 6/2013 Simpson et al.
2013/0154218 A1 6/2013 Tiilikainen
2013/0223971 A1 8/2013 Grace, IV
2014/0076759 A1 3/2014 Roehm et al.
2014/0161518 A1 6/2014 Ko
2014/0166516 A1 6/2014 Martinez
2014/0265440 A1 9/2014 Chen et al.
2015/0034515 A1 2/2015 Monyak et al.
2015/0151427 A1 6/2015 Ben-Gigi
2015/0274362 A1 10/2015 Christopher et al.
2015/0376917 A1 12/2015 Brunner
2016/0023349 A1 1/2016 Hoppe et al.
2016/0130034 A1 5/2016 Kuhls
2016/0144500 A1 5/2016 Chen
2016/0168880 A1 6/2016 Phelan
2016/0221177 A1 8/2016 Reinhart
2017/0121056 A1 5/2017 Wang
2017/0138382 A1 5/2017 Ko
2017/0165828 A1 6/2017 Fleischmann
2017/0166352 A1 6/2017 Hoppe
2017/0174392 A1 6/2017 De Loynes
2017/0217464 A1 8/2017 Bar-Erez et al.
2017/0239808 A1 8/2017 Hoppe
2017/0257958 A1 9/2017 Sabbag et al.
2017/0266804 A1 9/2017 Kinskey
2017/0318927 A1 11/2017 Kraus
2017/0349013 A1 12/2017 Gronholm
2018/0044059 A1 2/2018 Brunner
2018/0099405 A1 4/2018 Reinhart
2018/0153312 A1 6/2018 Buck et al.
2018/0161975 A1 6/2018 Brunner
2018/0186513 A1 7/2018 Brunner
2018/0220758 A1 8/2018 Burchia
2018/0290288 A1 10/2018 Brunner
2019/0002004 A1 1/2019 Brunner
2019/0031222 A1 1/2019 Takyar et al.
2019/0039781 A1 2/2019 Kogel
2019/0106244 A1 4/2019 Brunner et al.
2019/0225371 A1 7/2019 Hoppe et al.
2020/0055534 A1 2/2020 Hassell
2020/0147781 A1 5/2020 Squiers et al.
2020/0165036 A1 5/2020 Squiers et al.
2020/0243925 A1 7/2020 Polakowski et al.
2020/0299027 A1 9/2020 Brunner et al.

FOREIGN PATENT DOCUMENTS

CN 101068661 11/2007
CN 102137795 7/2011
CN 102248523 11/2011
CN 102469899 5/2012
CN 102608238 7/2012
CN 102834035 12/2012
CN 302371147 3/2013
CN 103118578 5/2013
CN 103659777 3/2014
CN 204161752 2/2015
DE 3510307 9/1986
DE 9313802 12/1993
DE 4415638 11/1995
DE 29708343 7/1997
DE 19750543 5/1999
DE 20218996 3/2003
DE 102004057870 6/2006
DE 202011002617 4/2011
DE 102010003754 10/2011
DE 102010003756 10/2011
DE 102012106482 1/2014
DE 102012220837 5/2014
DE 202014103695 10/2014
DE 102013008630 11/2014
DE 202015105053 10/2016
DE 202015005752 11/2016
DE 102015112204 2/2017
DE 102015013053 4/2017
DE 402018201520 5/2018
EM 000705231-0001 4/2007
EM 002419283-0001 3/2014
EP 0916302 5/1999
EP 1018473 B1 1/2003
EP 1321247 6/2003
EP 1428764 6/2004
EP 1428764 B1 6/2004
EP 1724069 A2 11/2006
EP 1819487 8/2007
EP 2289671 3/2011
EP 2346741 7/2011
EP 2456341 5/2012
EP 2555660 2/2013
EP 2555661 2/2013
EP 2537641 B1 9/2016
EP 2338650 B1 10/2016
EP 2805799 11/2016
EP 3141354 3/2017

(56) References Cited

FOREIGN PATENT DOCUMENTS

| | | | |
|---|---|---|---|
| GB | 694707 | | 7/1953 |
| GB | 2047181 | B | 2/1983 |
| GB | 2110076 | | 6/1983 |
| GB | 2211486 | | 7/1989 |
| GB | 2330521 | | 4/1999 |
| GB | 2406331 | | 3/2005 |
| GB | 2413265 | | 10/2005 |
| GB | 2449934 | | 12/2008 |
| JP | 2003194020 | A | 7/2003 |
| JP | D1180963 | | 8/2003 |
| JP | 1276744 | | 7/2006 |
| JP | D1395115 | | 8/2010 |
| JP | D1395116 | | 8/2010 |
| JP | D1455321 | | 11/2012 |
| JP | 2013022972 | | 2/2013 |
| JP | 2013022976 | | 2/2013 |
| JP | 1477050 | | 8/2013 |
| JP | D1503434 | | 7/2014 |
| JP | D1625407 | | 2/2019 |
| JP | D1665028 | | 8/2020 |
| KR | 30-0271616 | | 2/2000 |
| KR | 30-0320243 | | 6/2002 |
| KR | 3008066040000 | | 7/2015 |
| KR | 3008422360000 | | 3/2016 |
| KR | 3008496000000 | | 4/2016 |
| KR | 3008599650000 | | 6/2016 |
| KR | 3008812960000 | | 11/2016 |
| KR | 3009995990000 | | 3/2019 |
| TW | 206875 | | 5/1993 |
| TW | I324578 | | 5/2010 |
| TW | 135074 | | 6/2010 |
| TW | 168686 | | 7/2015 |
| TW | 174412 | | 3/2016 |
| TW | D192092 | | 8/2018 |
| WO | WO2005/045886 | | 5/2005 |
| WO | WO2007/121746 | | 11/2007 |
| WO | WO07121745 | | 11/2007 |
| WO | WO07121746 | | 11/2007 |
| WO | WO2007121745 | A1 | 11/2007 |
| WO | WO2009/140965 | | 11/2009 |
| WO | WO09140965 | | 11/2009 |
| WO | WO2011/009480 | | 1/2011 |
| WO | WO11009480 | | 1/2011 |
| WO | WO2011/131213 | | 10/2011 |
| WO | WO2012/000497 | | 1/2012 |
| WO | WO2013/026084 | | 2/2013 |
| WO | WO13026084 | | 2/2013 |
| WO | WO2014/125484 | | 8/2014 |
| WO | WO2014/125488 | | 8/2014 |
| WO | WO14125488 | | 8/2014 |
| WO | WO 2016142935 | | 9/2016 |
| WO | WO 2017028845 | | 2/2017 |
| WO | WO2017191628 | | 11/2017 |
| WO | WO2017/212840 | | 12/2017 |
| WO | WO17212840 | | 12/2017 |

OTHER PUBLICATIONS

“Blitz Box—Portable Storage Box / Shelf,” The Green Head Finds Cool New Stuff, https://www.thegreenhead.com/2013/03/blitz-box-portable-storage-box-shelf.php, Per Wayback, website dates back to Feb. 15, 2015, 5 pages.

“BluCave Universal Storage System,” Batavia Tools to Build, https://batavia.eu/blucave-storage-system/, available at least as early as Jun. 11, 2019, 9 pages.

“BluCave Universal Storage System,” Batavia Tools to Build, https://batavia.eu/blucave-storage-system/, believed to be available at least as early as Nov. 29, 2017, 5 pages.

“Dewalt TSTAK Carrier Trolley,” ITS, https://www.its.co.uk/pd/171229-Dewalt-TSTAK-Carrier-Trolley-_DEW171229.htm, available at least as early as Jun. 11, 2019, 3 pages.

“Dewalt TSTAK Carrier Trolley,” ITS, https://www.its.co.uk/pd/171229-Dewalt-TSTAK-Carrier-Trolley-_DEW171229.htm, Per Wayback, website dates back to May 2, 2015, 2 pages.

“DeWalt TSTAK Vac Rack (Suits DW DWV902M & DWV900L) DWV9500-XJ,” Get Tools Direct, https://www.gettoolsdirect.com.au/dewalt-tstak-vac-rack-suits-dwv902m-and-dwv900-dwv9500-xj.html, available at least as early as Jun. 11, 2019, 4 pages.

“DeWalt TSTAK Vac Rack (Suits DW DWV902M & DWV900L) DWV9500-XJ,” Get Tools Direct, https://www.gettoolsdirect.com.au/dewalt-tstak-vac-rack-suits-dwv902m-and-dwv900l-dwv9500-xj.html, believed to be available at least as early as Nov. 29, 2017, 4 pages.

“Hopkins FloTool 91002 Rhino Box with Mount,” Amazon.com, https://www.amazon.com/exec/obidos/ASIN/B003K15F3I/20140000-20, Available at least as early as Jun. 11, 2019, 7 pages.

“Hopkins FloTool 91002 Rhino Box with Mount,” Amazon.com, https://www.amazon.com/exec/obidos/ASIN/B003K15F3I/20140000-20, believed to be available at least as early as Nov. 29, 2017, 7 pages.

“Tool Skool, TSTAK Phase 2 Upgrades | TSTAK Carts—First Look—Tool Skool,” YouTube, allegedly available on Sep. 7, 2013, https://www.youtube.com/watch?v=jb06y6J1dr4&feature=youtu.be&t=197, 1 page.

“Tool Skool, TSTAK Phase 2 Upgrades | TSTAK Carts—First Look—Tool Skool,” YouTube, Sep. 7, 2013, https://www.youtube.com/watch?v=jb06y6J1dr4&feature=youtu.be&t=197, 1 page.

Batavia Gmbh, BluCave Storage System, https://protect-us.mimecast.com/s/5XIGCR6KypcgJnIKi9EDoim?domain=batavia.eu, believed to be available at least as early as Nov. 29, 2017, 7 pages.

BluCave Video, https://www.youtube.com/watch?v=Sw7fQQPwoOtY&feature=youtu.be&t=32, believed to be available at least as early as Nov. 29, 2017.

International Search Report and Written Opinion for International Application No. PCT/IL2019/050689, dated Aug. 23, 2019, 21 pages.

International Search Report and Written Opinion for International Application No. PCT/IL2020/050433, dated Jun. 21, 2020, 14 pages.

International Search Report and Written Opinion for International Application No. PCT/US2018/033161, dated Aug. 6, 2018.

International Search Report and Written Opinion for International Application No. PCT/US2018/044629, dated Jan. 9, 2019.

International Search Report and Written Opinion for International Application No. PCT/US2019/014940, dated Jul. 26, 2019, 9 pages.

Non-Final Rejection issued Apr. 12, 2018, in U.S. Appl. No. 15/826,201. (16 Pages).

Sortimo Logistix, “Mobile Sortimente”, brochure, Available at least as early as Jun. 11, 2019, 17 pages.

Sortimo Logistix, “Mobile Sortimente”, brochure, believed to be available at least as early as Nov. 29, 2017, 17 pages.

Stuart, “Ryobi ToolBlox Tool Cabinet System!,” TOOLGUYD, allegedly available on Sep. 19, 2014, https://toolguyd.com/ryobi-toolblox-cabinets/, 23 pages.

Stuart, “Ryobi ToolBlox Tool Cabinet System!,” TOOLGUYD, Sep. 18, 2014, https://toolguyd.com/ryobi-toolblox-cabinets/, 23 pages.

Stuart, “Sys-Cart Base, a Systainer Mounting Platform,” TOOLGUYD, allegedly available on Jul. 28, 2014, https://toolguyd.com/systainer-sys-cart-mounting-base/, 10 pages.

Stuart, “Sys-Cart Base, a Systainer Mounting Platform,” TOOLGUYD, Jul. 28, 2014, https://toolguyd.com/systainer-sys-cart-mounting-base/, 11 pages.

Vertak, https://www.alibaba.com/product-detail/Vertak-global-patented-multi-funciton-portable_60217794260.html, believed to be available at least as early as Nov. 29, 2017.

Respondent’s Notice of Prior Art, Investigation No. 337-TA-1409, dated Oct. 29, 2024, 11 pages.

Inter Partes Review No. 2024-01400, “Petition for Inter Partes Review of U.S. Pat. No. 11,365,026” Filed Sep. 17, 2024, 147 pages.

Exhibit 1001 in “Petition for Inter Partes Review of U.S. Pat. No. 11,365,026” Filed Sep. 17, 2024, 66 pages.

Exhibit 1002 in “Petition for Inter Partes Review of U.S. Pat. No. 11,365,026” Filed Sep. 17, 2024, 324 pages.

(56) References Cited

OTHER PUBLICATIONS

Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of US Pat. No. 11,794, 952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of US Pat. No. 11,794, 952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of US Pat. No. 11,794, 952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of US Pat. No. 11,794, 952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794,952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

* cited by examiner

STORAGE DEVICE SYSTEM

CROSS-REFERENCE TO RELATED APPLICATIONS

This application is a continuation of U.S. application Ser. No. 15/375,492, filed Dec. 12, 2016, which claims priority to U.S. Provisional Patent Application No. 62/267,071, filed on Dec. 14, 2015, each of which are hereby incorporated by reference in its entirety.

BACKGROUND

The present invention relates to storage devices, including bags, storage totes, tool boxes and organizers.

Tool storage devices are often used to transport tools and accessories. Tool storage devices include soft-sided storage devices such as a tool bags, and rigid storage devices such as tool boxes and organizers. Soft-sided storage devices include walls made of flexible material and typically have a bottom made of a rigid material. Rigid storage devices include a rigid base and a rigid cover coupled thereto. The rigid base may include dividers and storage compartments for storing and organizing tools and accessories.

SUMMARY

In one embodiment, the invention provides a storage device system including a storage case having a base and a cover coupled to the base, and a plurality of insertable bins removably positioned within an interior of the base. The plurality of insertable bins includes a first bin having a first height and a set of second bins each having a second height. The set of second bins is configured to be stackable and have a stacked height when stacked. A depth of the interior of the base, the first height, and the stacked height are equal.

In another embodiment, the invention provides a storage device system including a storage case having a base and a cover coupled to the base, and a plurality of insertable bins removably positioned within an interior of the base. The insertable bins include a first bin and a second bin configured to be stackable. The first bin has a ledge formed on an inner surface of the first bin. The ledge is configured to engage and support the second bin when the second bin is stacked on the first bin. The second bin has a rib on an outer surface to inhibit suctioning when the second bin is stacked on the first bin.

In yet another embodiment, the invention provides a storage device system including a soft-sided storage device having a rigid bottom, and a rigid storage device having a top that interfaces with the bottom of the soft-sided storage device. The storage device system further includes a latch assembly operable to secure the soft-sided storage device and the rigid storage device together. The soft-sided storage device and the rigid storage device being carryable as a coupled unit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
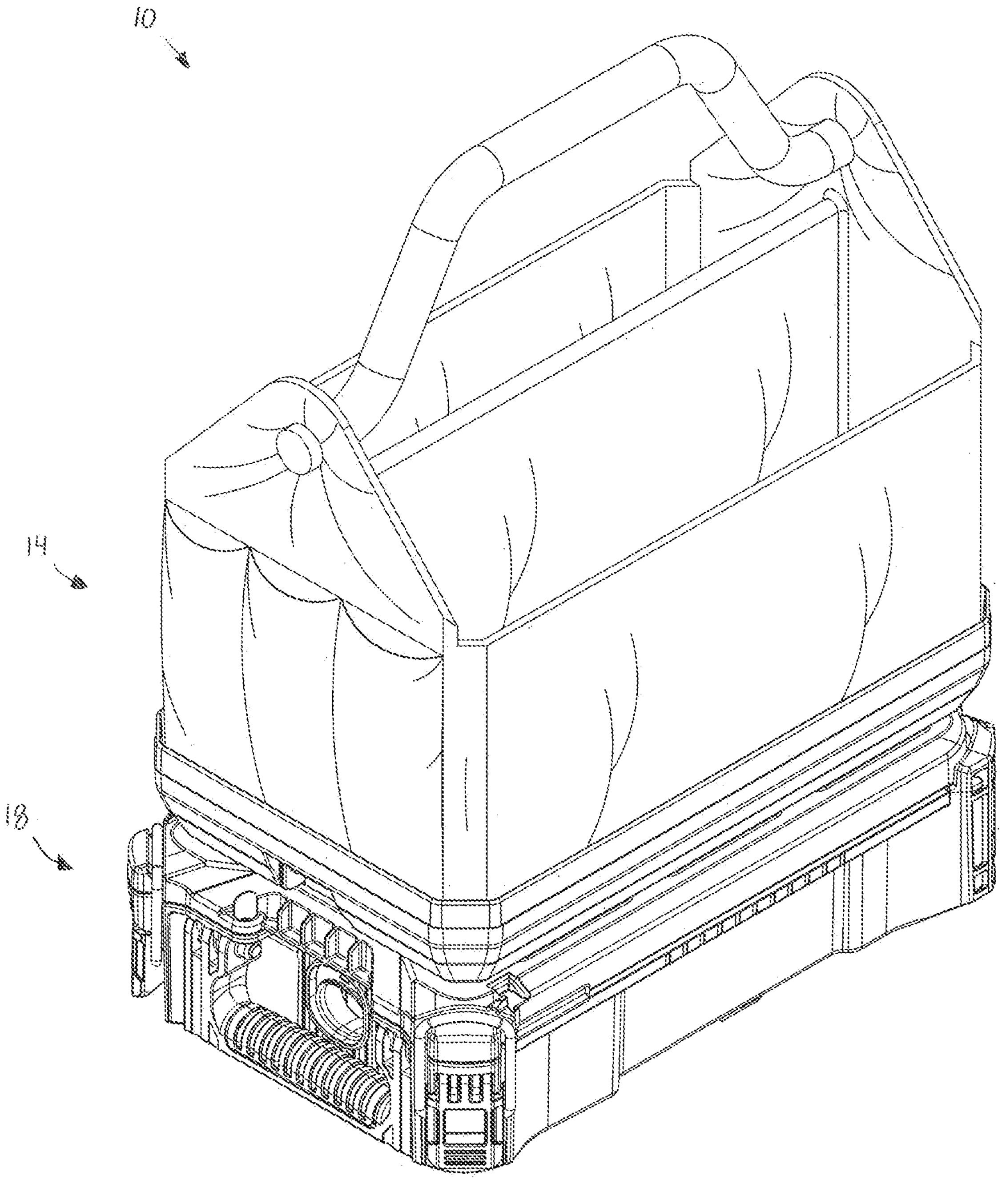
FIG. 1 is a perspective view of a storage device system including a soft-sided storage device coupled to a rigid storage device.

FIG. 1 illustrates a storage device system 10 including a soft-sided storage device 14, such as soft-sided bag, removably coupled to a hard-sided or rigid storage device 18, such as a rigid storage case (e.g., a rigid tool box or organizer).

Figure 2:
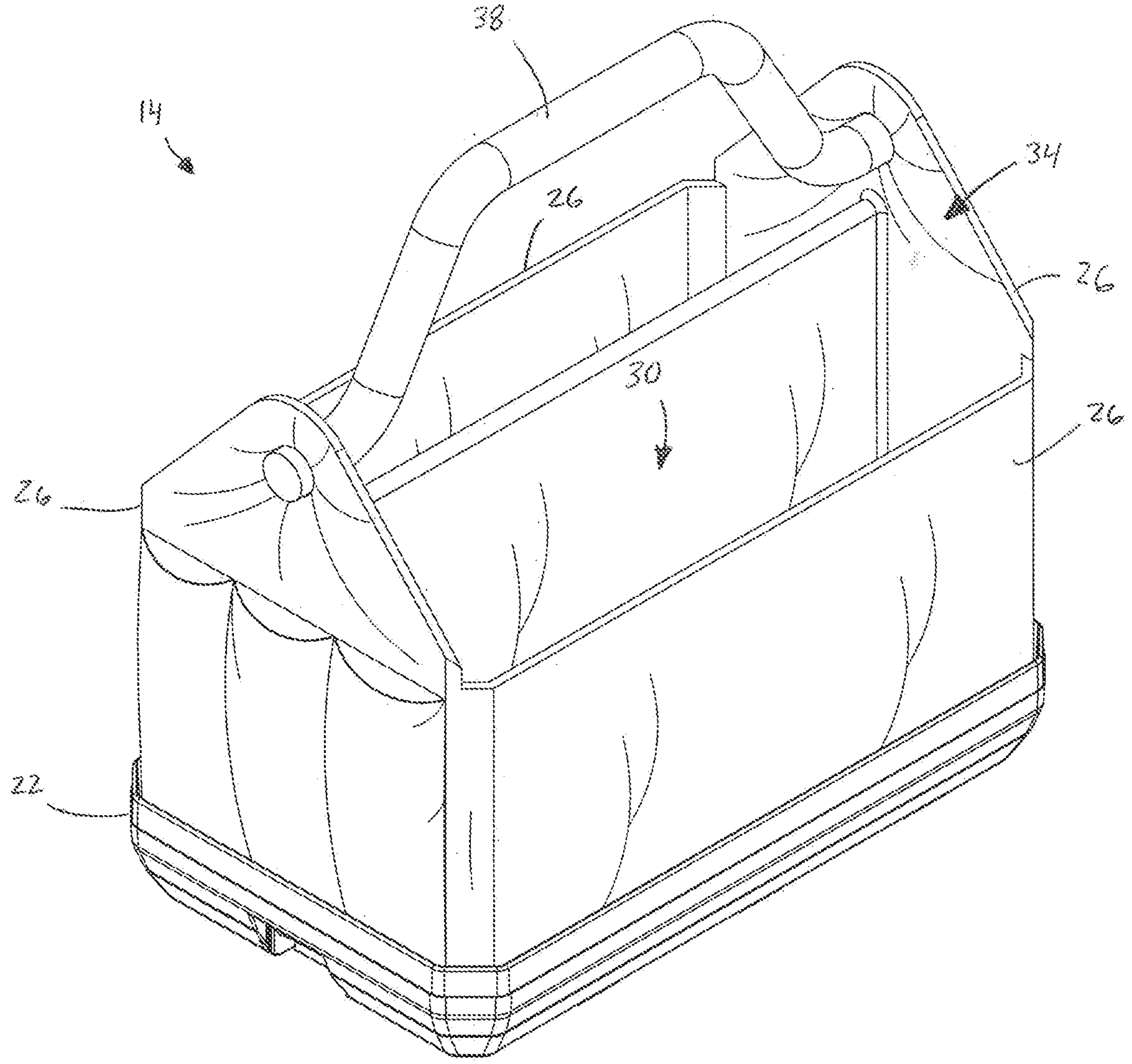
FIG. 2 is a perspective view of the soft-sided storage device of FIG. 1.
Figure 3:
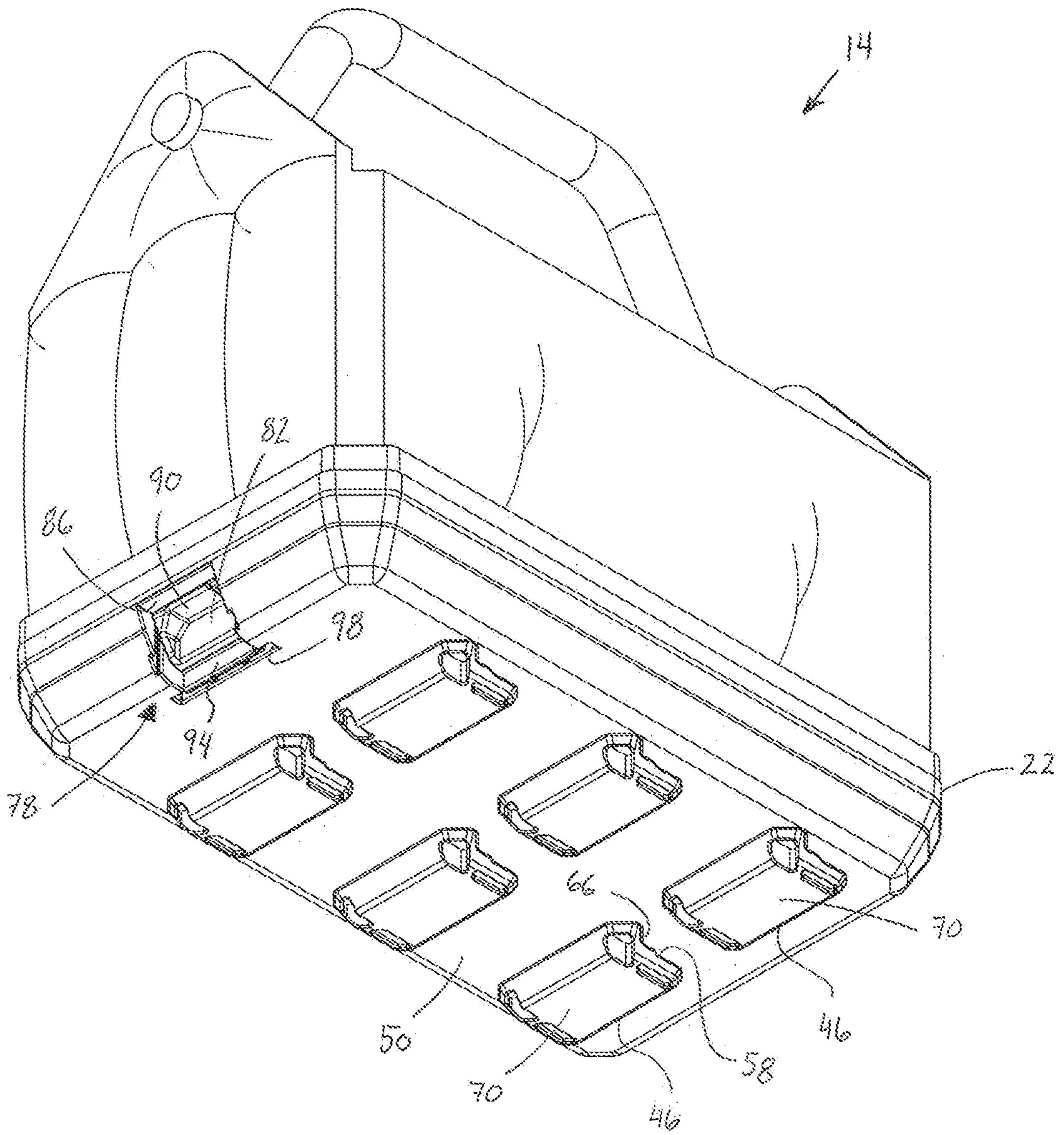
FIG. 3 is a bottom perspective view of the soft-sided storage device of FIG. 2.
Figure 4:
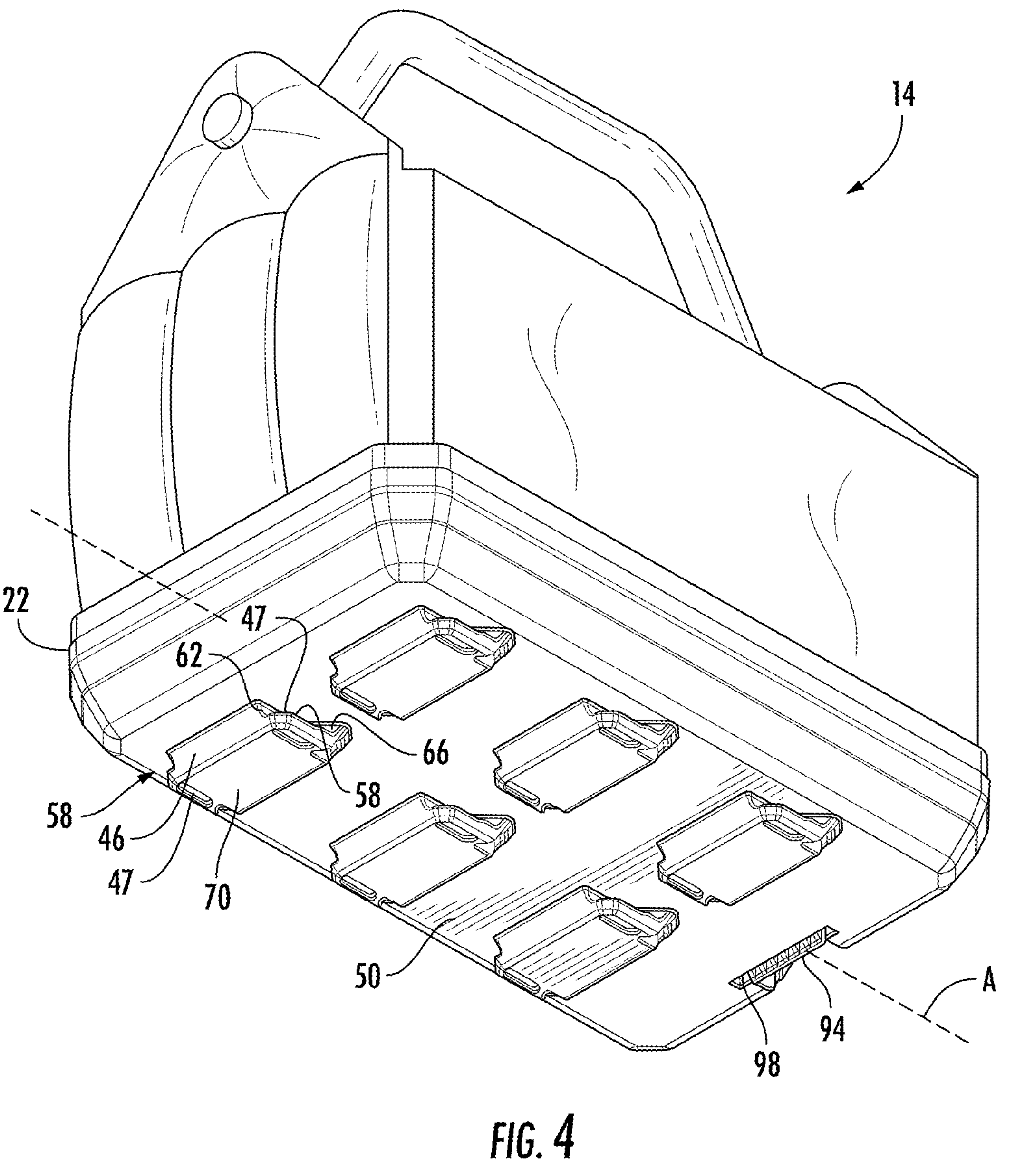
FIG. 4 is another bottom perspective view of the soft-sided storage device of FIG. 2.

With reference to FIGS. 2-4, the bag 14 includes a rigid or hard bottom member 22 (e.g., thermoform plastic, etc.) and flexible sidewalls 26 cooperating to define a storage compartment 30. The sidewalls 26 define an open top 34 for access to the storage compartment 30. A handle 38 is connected between opposite sidewalls 26 and is engageable by a user to carry the bag 14.

One or more interface or connection projections 46 are provided on the bottom member 22. In the illustrated embodiment, each projection 46 extends from a bottom surface 50 of the bottom member 22 and is configured to cooperate with a connection recess 54 (FIGS. 5-6) on the storage case 18 to interface and connect the bag 14 to the storage case 18. In the illustrated embodiment, each projection 46 is formed integrally with the bottom member 22, for example, in a thermoforming process. Each projection 46 has a channel 58 on each side of the projection 46, including a first channel 58 and a second channel 58, extending parallel to a longitudinal axis A of the bottom member 22, as best shown in FIG. 4. Each channel 58 has a front, open end 62 and a back, closed end 66 along the axis A. One or more projections 46 includes projection portions 47, including a first projection portion 47 extending from the respective projection 46 in a first direction and a second projection portion 47 extending from the respective projection 46 in a second direction, and the projections 46 define channels 58. Each projection 46 has a planar surface 70 with a generally rectangular shape. In other embodiments, the planar surface 70 may be another shape, e.g., circular, triangular, etc. In the illustrated embodiment, there are six projections 46 arranged in three rows of two along the axis A. In other embodiments, the bag 14 may include fewer or more projections 46, and/or the projections 46 may be arranged in different patterns. The projections 46 are arranged such that the bag 14 can be supported on a surface by the projections 46 through contact with the planar surfaces 70.

Figure 9:
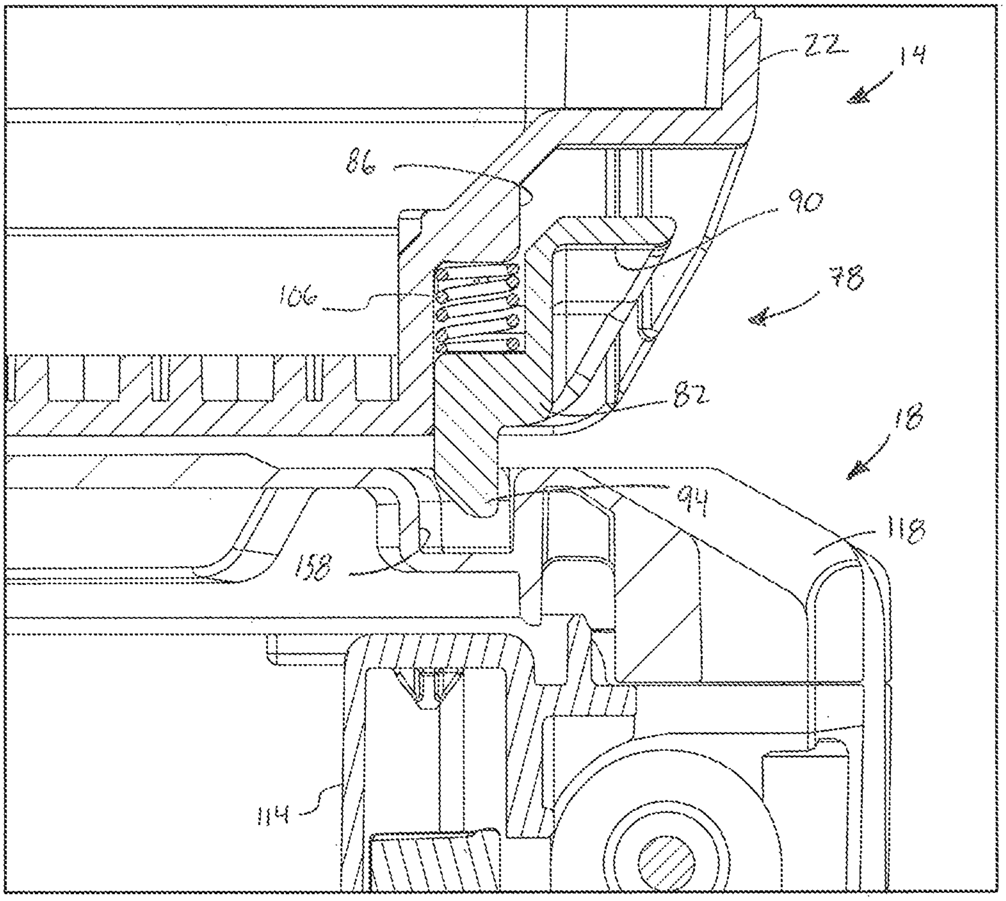
FIG. 9 is an enlarged cross-sectional view of a portion of the storage device system of FIG. 1, illustrating a latch assembly in a locking position.
Figure 10:
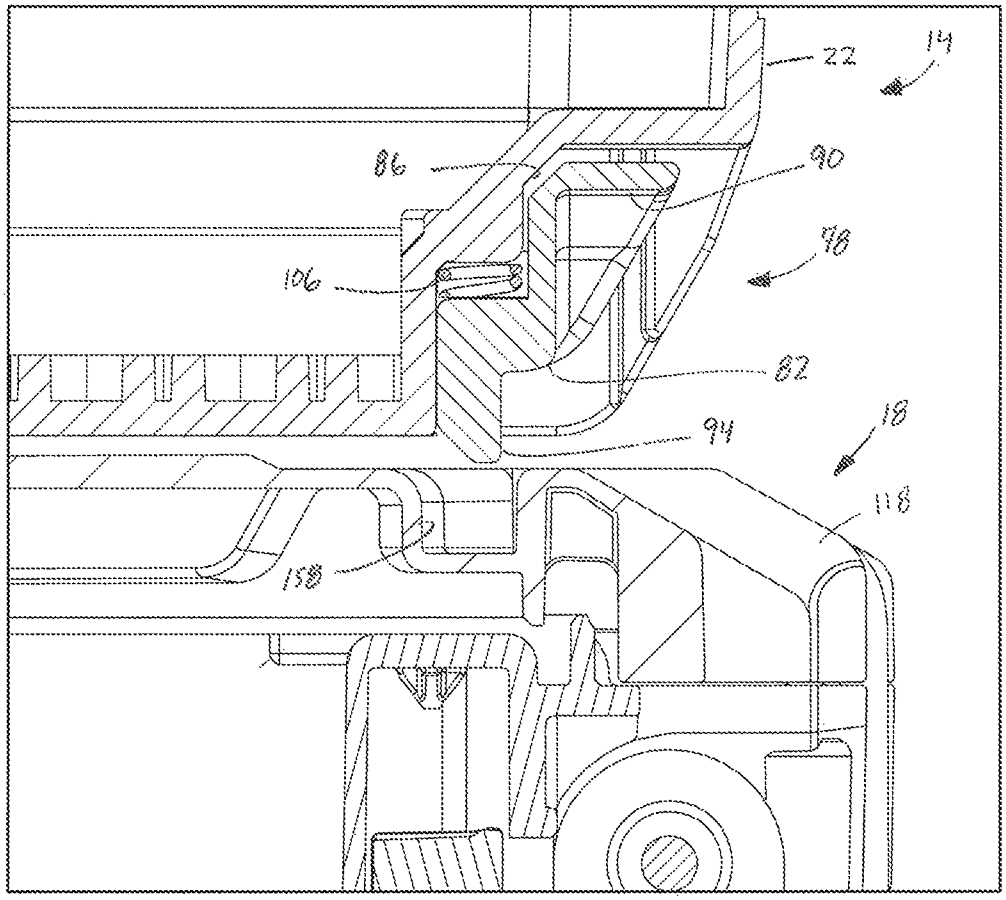
FIG. 10 is an enlarged cross-sectional view of the portion of the storage device system shown in FIG. 9, illustrating the latch assembly in an unlocking position.

The bag 14 further includes a latch assembly 78 including a latch member 82, as shown in FIG. 3. The latch assembly 78 is supported by the bottom member 22 within a latch passage 86 defined in the bottom member 22. The latch member 82 includes a grip portion 90 and an interference portion 94. The latch member 82 is slidingly movable along an axis perpendicular to the longitudinal axis A of the bottom member 22 within the latch passage 86. The interference portion 94 selectively protrudes from the latch passage 86 through a slot 98 defined in the bottom surface 50 of the bottom member 22. The interference portion 94 has a tapered surface 102 (FIG. 7) at a distal end thereof. The latch member 82 is movable between a first or locking position (FIG. 9) in which the interference portion 94 extends through the slot 98, and a second or unlocking position (FIG. 10) in which the interference portion 94 is retracted into the latch passage 86 and does not extend through the slot 98. The latch assembly 78 further includes a biasing member 106 (e.g., a compression spring) arranged to bias the latch member 82 into the locking position (FIG. 9). The latch member 82 may be urged against the biasing member 106 to the unlocking position (FIG. 10) by pushing on the grip portion 90. In the locking position, the interference portion 94 does not extend beyond the planar surfaces 70 of the projections 46.

Figure 5:
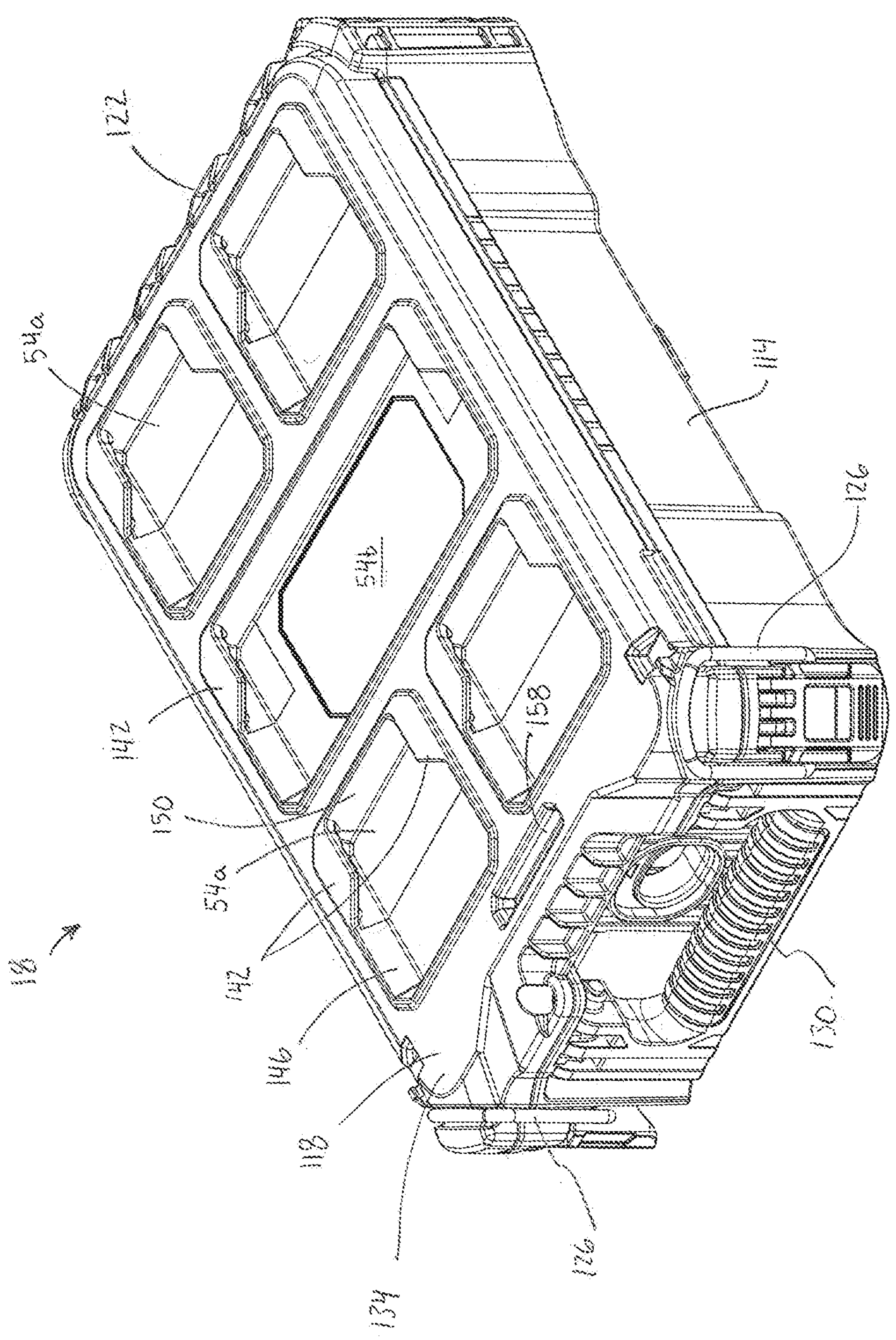
FIG. 5 is a top perspective view of the rigid storage device of FIG. 1.
Figure 6:
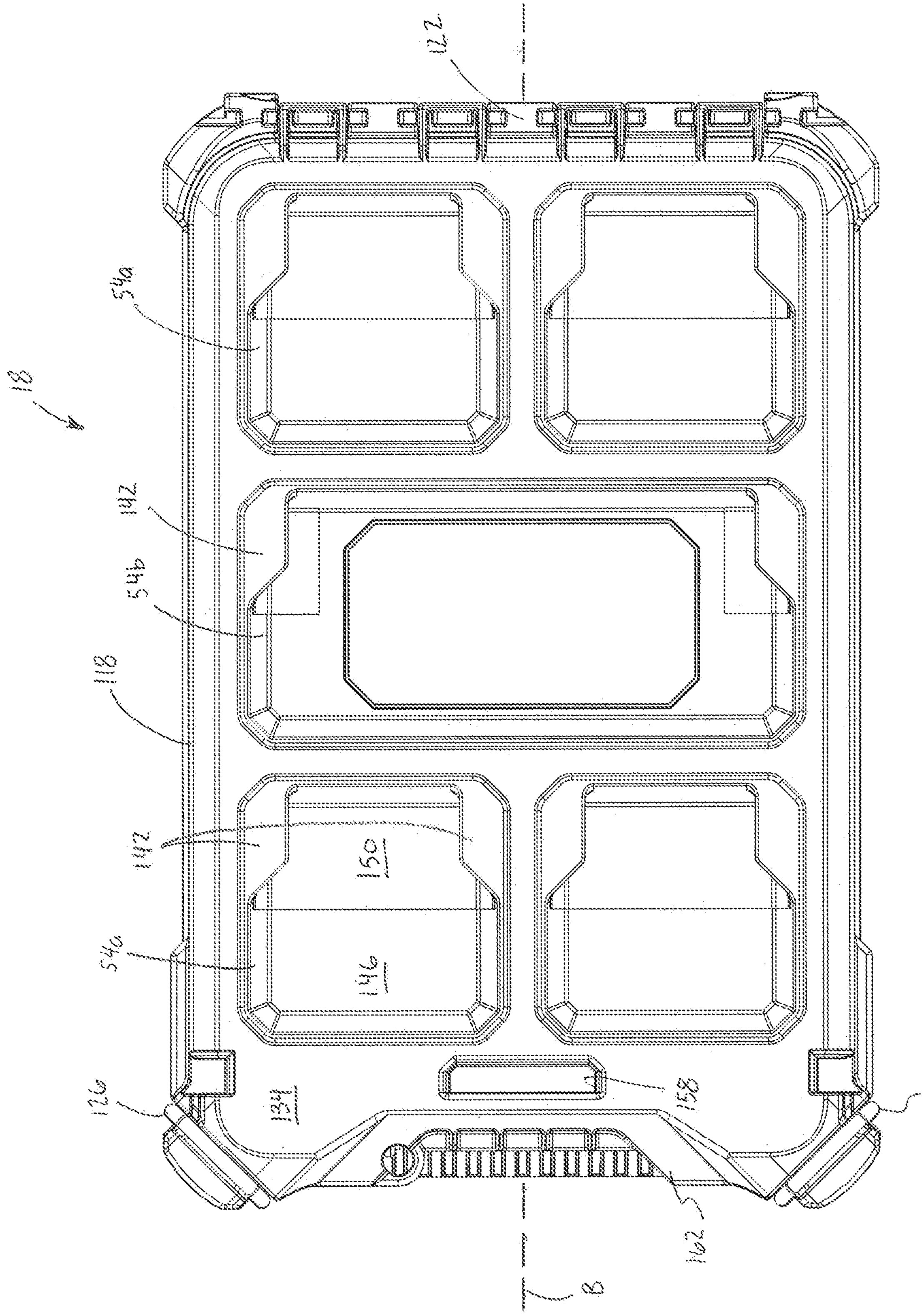
FIG. 6 is a top view of the rigid storage device of FIG. 5.
Figure 11:
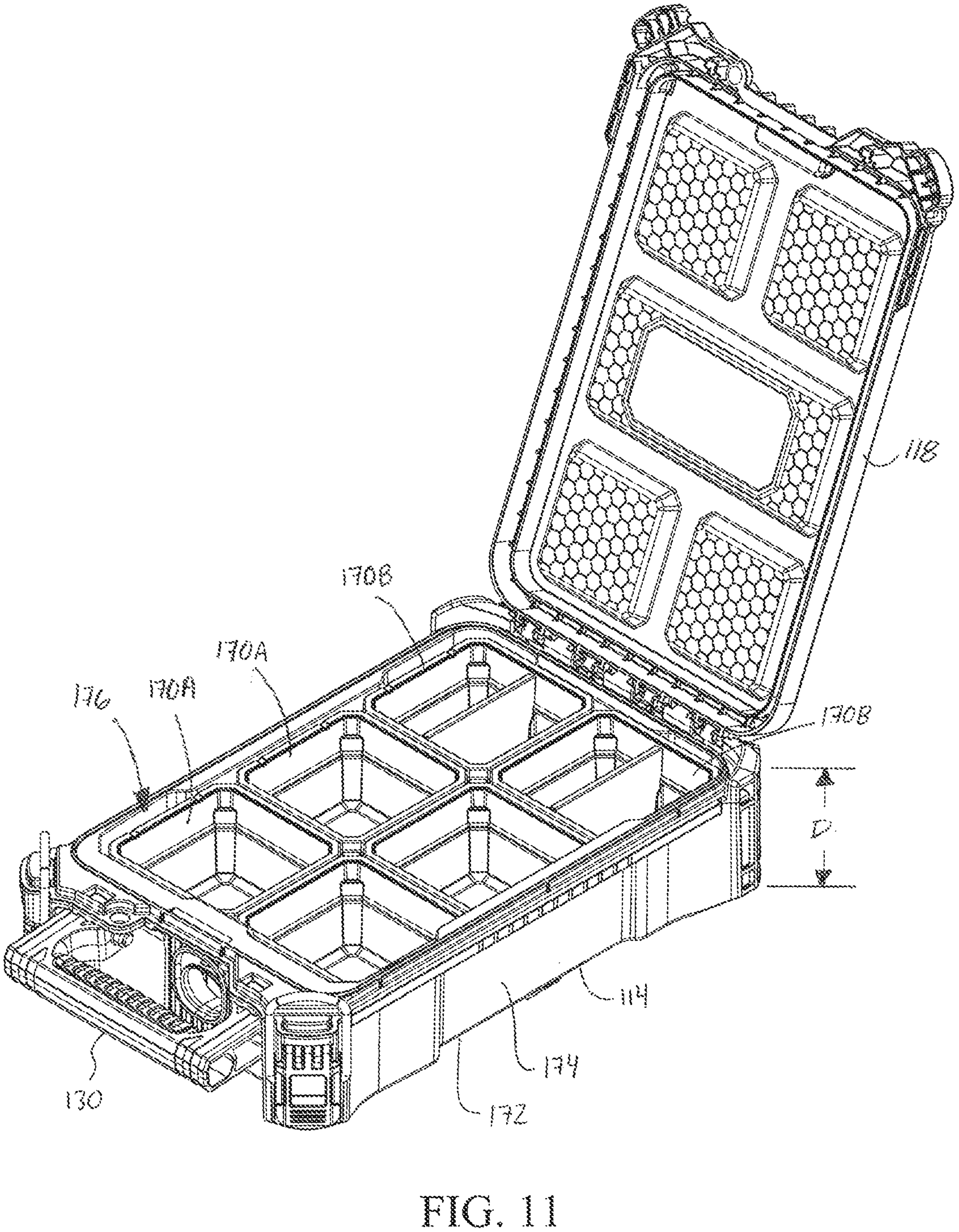
FIG. 11 is a perspective view of the rigid storage device of FIG. 5, illustrating a cover in an open position.
Figure 12:
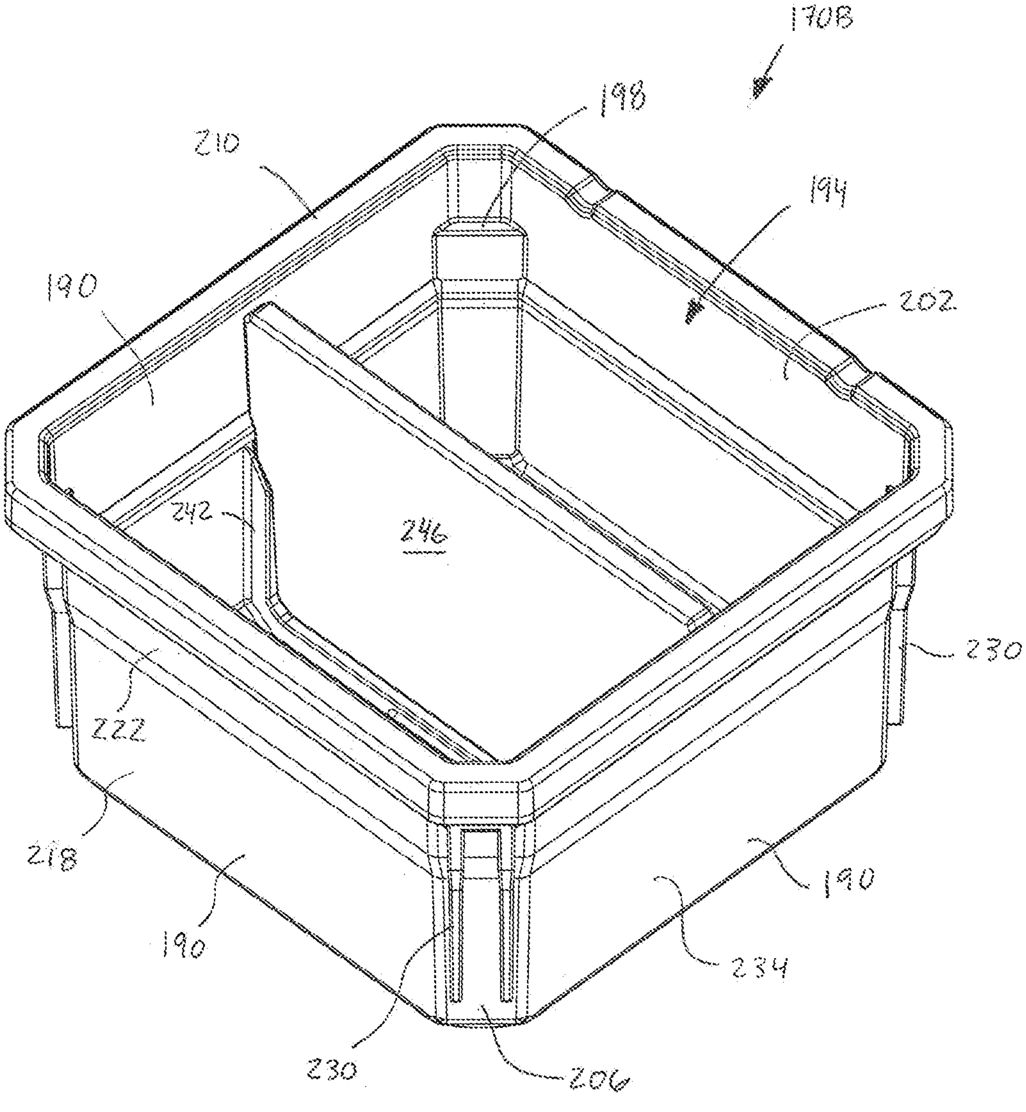
FIG. 12 is a top perspective view of a bin for use with the storage case.

With reference to FIGS. 5 and 6, the storage case 18 includes a base 114 and a top or cover 118. The cover 118 is movably coupled to the base 114 between a closed position (FIG. 5) and an open position (FIG. 11). In the illustrated embodiment, the cover 118 is pivotally coupled to the base 114 by a hinge 122. The cover 118 includes cover latches 126 to releasably secure the cover 118 in the closed position. The storage case 18 also includes a side handle 130 to facilitate independently carrying the storage case 18.

With continued reference to FIGS. 5 and 6, a top surface 134 of the cover 118 defines the connection recesses 54 that receive and cooperate with the projections 46. In the illustrated embodiment, the connection recesses 54 include two rows of two small recesses **54*a* corresponding to two rows of two projections 46 and one large recess 54*b* corresponding to a row of two projections 46. In other embodiments, the cover 118 may include different numbers of patterns of recesses 54, depending on the arrangement of the projections 46 on the bag 14. When the projections 46 are received in the connection recesses 54, the bottom surface 50 of the bottom member 22 is arranged to contact and be supported by the top surface 134 of the cover 118**.

Figure 7:
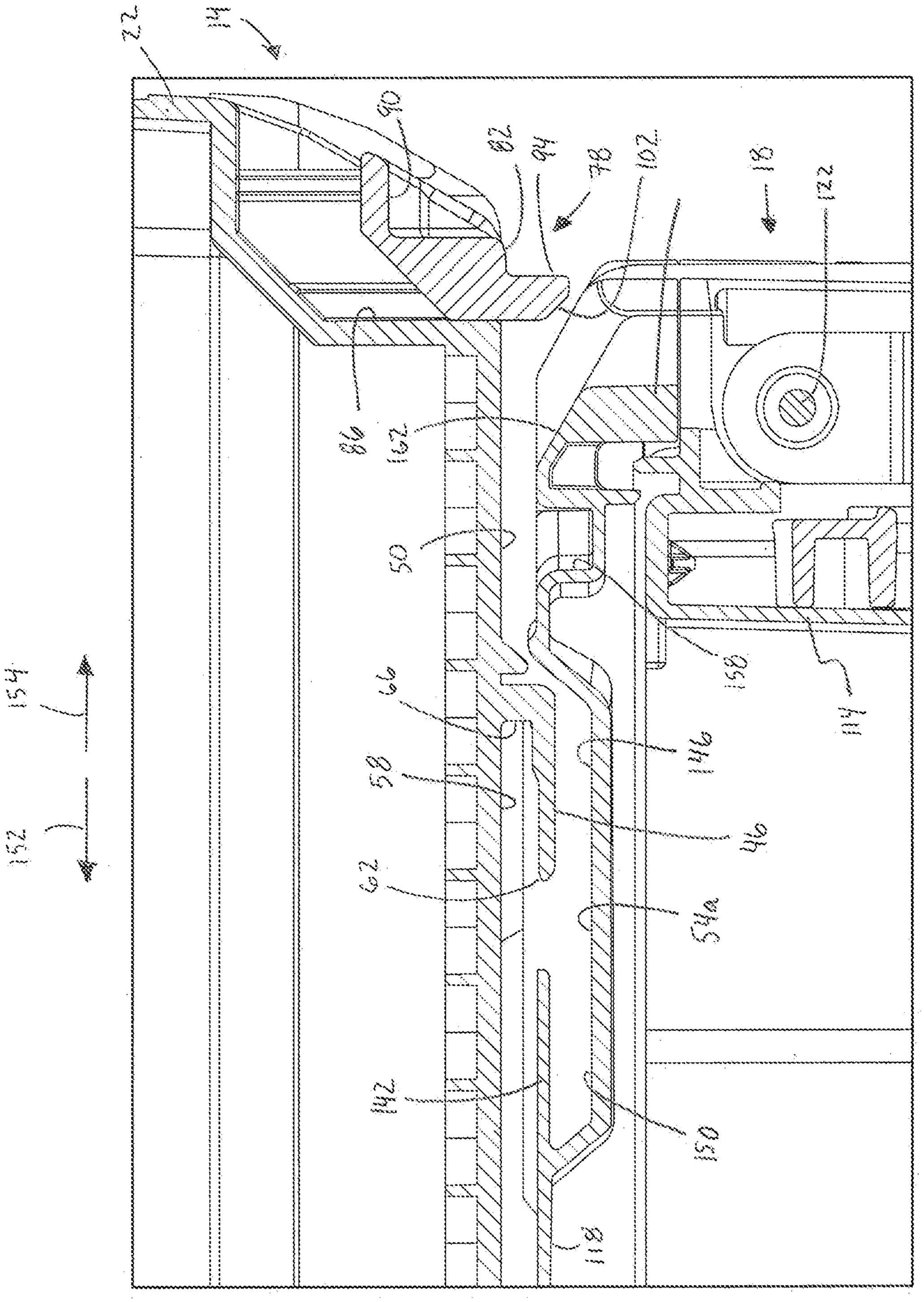
FIG. 7 is an enlarged cross-sectional view of a portion of the storage device system of FIG. 1, illustrating a bottom of the soft-sided storage device disengaged from a top of the rigid storage device.
Figure 8:
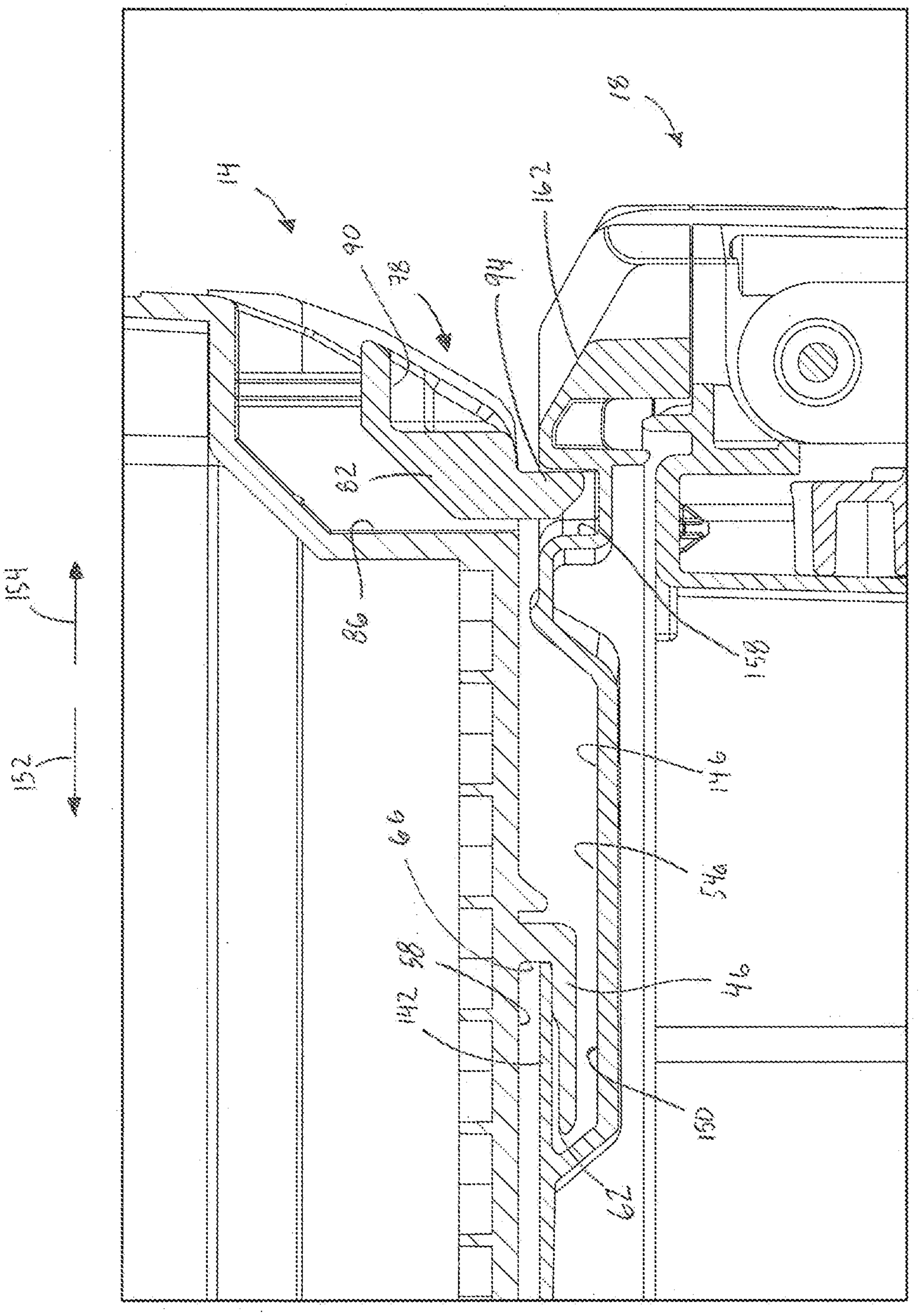
FIG. 8 is an enlarged cross-sectional view of the portion of the storage device system shown in FIG. 7, illustrating the bottom of the soft-sided storage device engaged with the top of the rigid storage device.

Two interference projections or wings 142 extends into each connection recess 54 parallel to a longitudinal axis B of the cover 118 on opposite sides of the connection recess 54 from one end of the connection recess 54. Each of the wings 142 corresponds to and is configured to cooperate with a corresponding one of the channels 58 of the projection 46 received by the respective connection recess 54. Each of the wings 142 has a length that extends approximately half the connection recess 54 to define a first portion 146 of the connection recess 54 and a second portion 150 opposite the wings 142, which remains open. The second portion 150 of each connection recess 54 is sized to receive one of the projections 46 generally perpendicular to the longitudinal axis B into a first, disconnected position (FIG. 7). In the disconnected position, the projections 46 are oriented within the connection recesses 54 such that the open ends 62 of the channels 58 are nearer to the wings 142 than the closed ends 66. Once in the disconnected position, the bottom member 22 may be slid relative to the cover 118 parallel the longitudinal axes A, B in a first direction 152 toward the wings 142 such that the wings 142 are received within the channels 58 in a second, interfaced or connected position (FIG. 8). The wings 142 and the projections 46 engage within the connection recesses 54 to interface and connect the bottom member 22 with the cover 118 and prevent disconnection of the bottom member 22 from the cover 118, except in a second direction 154 opposite the first direction 152 and generally parallel to the longitudinal axes A, B. The wings 142 and the channels 58 engage one another perpendicular to the longitudinal axes A, B (i.e., perpendicular to the top surface 134 of the cover 118 and the bottom surface 50 of the bottom member 22) when carrying the bag 14 and the storage case 18 as a single unit via the handle 38 of the bag 14 (see FIG. 1).

With continued reference to FIGS. 5 and 6, the top surface 134 of the cover 118 further defines an interference or locking aperture 158. In the illustrated embodiment, the locking aperture 158 is located at one end of the cover 118. The end of the cover 118 has a sloped surface 162 adjacent the locking aperture 158. The locking aperture 158 is elongate and extends transverse to the longitudinal axis B of the cover 118 parallel to a short side of the cover 118. The locking aperture 158 is located such that when the bottom member 22 and the cover 118 are in the connected position, the locking aperture 158 is aligned with the interference portion 94 of the latch member 82. The locking aperture 158 is sized to receive and engage the interference portion 94 when the latch member 82 is in the locking position (FIG. 9). When the interference portion 94 is engaged with the locking aperture 158 in the locking position, the latch member 82 obstructs movement of the bottom member 22 relative to the cover 118 from the connected position to the disconnected position in the second direction 154, thereby inhibiting disconnection of the bag 14 from the storage case 18. In particular, the interference portion 94 interferes with the cover 118 within the locking aperture 158 such that the wings 142 cannot be removed from the channels 58 of the projections 46 in the second direction 154.

A user may couple the soft-sided bag 14 to the rigid storage case 18 to carry as a coupled unit by first, inserting the connection projections 46 of the bottom member 22 in a direction perpendicular to the cover 118 and into the second portion 150 of the connection recesses 54 of the cover 118 such that the cover 118 supports the bag 14 in the disconnected position (FIG. 7). The bottom member 22 and the cover 118 are oriented such their longitudinal axes A, B are parallel, and the latch assembly 78 is nearest the end of the cover 118 defining the locking aperture 158. The bag 14 (i.e., the bottom member 22) is then manually slid in the first direction 152 such that the wings 142 are received in the channels 58 through the open end 62 of the channels 58 until the wings 142 abut the closed end 66 of the channels 58 in the connected position (FIG. 8). As the bottom member 22 slides relative to the cover 118 from the disconnected position to the connected position, the latch member 82, which is biased into the locking position (FIGS. 7 and 9) by the biasing member 106, is urged into the unlocking position (FIG. 8) by the sloped surface 162 of the cover 118 until aligned with the locking aperture 158 when in the connected position. The biasing member 106 then automatically biases the latch member 82 back into the locking position (FIG. 9) in which the interference portion 94 is received in and engages the locking aperture 158. Alternatively, a user may urge the latch member 82 into the unlocking position (FIG. 10) by pushing on the grip portion 90 upwardly against the biasing force of the biasing member 106. The user holds the latch member 82 in the unlocking position while sliding the bag 14 in the first direction 152 from the disconnected position to the connected position. Once in the connected position (FIG. 10), the user may release the latch member 82, thereby allowing the latch member 82 to be biased into the locking position where the interference portion 94 is received in and engages the locking aperture 158. The interference portion 94 of the latch member 82 extends into the locking aperture, thereby inhibiting relative movement of the bag 14 and the storage case 18 in the second direction 154 parallel to the longitudinal axes A, B. Accordingly, the latch assembly 78 and the locking aperture 158 cooperate to secure the soft-sided bag 14 and the rigid storage case 18 in the connected position as a unit to be carried by the handle 38 of the bag 14. The handle 38 is positioned such that when the bag 14 and the storage case 18 are coupled as a unit, the handle 38 is above a center of gravity of the coupled unit.

When the soft-sided bag 14 and the rigid storage case 18 are coupled together, the user may quickly decouple them to carry or access each of the storage devices 14, 18 separately. The user first urges the latch member 82 into the unlocking position (FIG. 10) by pushing on the grip portion 90 upwardly against the biasing force of the biasing member 106. While holding the latch member 82 in the unlocking position, the user then slides the bag 14 relative to the cover 118 in the second direction 154 along the longitudinal axes A, B from the connected position (FIG. 8) to the disconnected position (FIG. 7). The wings 142 disengage from the channels 58 and the projections 46 are moved into the second portion 150 of the connection recesses 54, allowing the bag 14 to be disconnected in a direction away from and perpendicular to the top surface 134 of the cover 118.

The latch assembly 78 is dimensioned and constructed to be movable between the locking and unlocking positions to couple the bag 14 to the cover 118. The latch assembly 78 does not interfere with opening the storage case 18 so that the storage case 18 on the bottom will still be able to be opened with the soft-sided bag 14 attached to the cover 118.

It should be understood that, in other constructions, multiple latch assemblies 78 and corresponding locking apertures 158 may be provided on the bag 14 and the storage case 18. Such an arrangement may, for example, provide an increased connection between the storage devices 14, 18, balance or reduce the load on a given latch assembly, etc.

It should also be understood that, in other constructions, the latch assembly 78 and the locking aperture 158 may be reversed (e.g., the movable latch member 82 and the biasing member 106 may be supported on the cover 118 or the base 114 of the storage case 18, and the locking aperture 158 may be defined by the bottom member 22 of the bag 14). Additionally or alternatively, the relative locations of the projections 46 and the recesses 54 may be reversed (e.g., the projections 46 may extend from the cover 118 of the storage case 18, and the recesses 54 may be formed in the bottom member 22 of the soft-sided bag 14).

As shown in FIG. 1, the storage devices 14, 18 have approximately the same perimeter dimensions. There is one pair of latch assembly 78 and locking aperture 158 at one end of the storage devices 14, 18. However, in alternate embodiments, the storage devices 14, 18 may have different perimeter dimensions (e.g., the bag 14 is shorter than the storage case 18). In such embodiments, the bag 14 may have fewer projections 46 arranged such that the bag 14 may be connected to the storage case 18 in substantially the same manner as described above, except where one or more of the connection recesses 54 in the cover 118 does not receive a projection 46. Additionally or alternatively, in some embodiments multiple soft-sided bags 14 having smaller dimensions than the storage case 18 may be simultaneously connected to the storage case 18.

Figure 13:
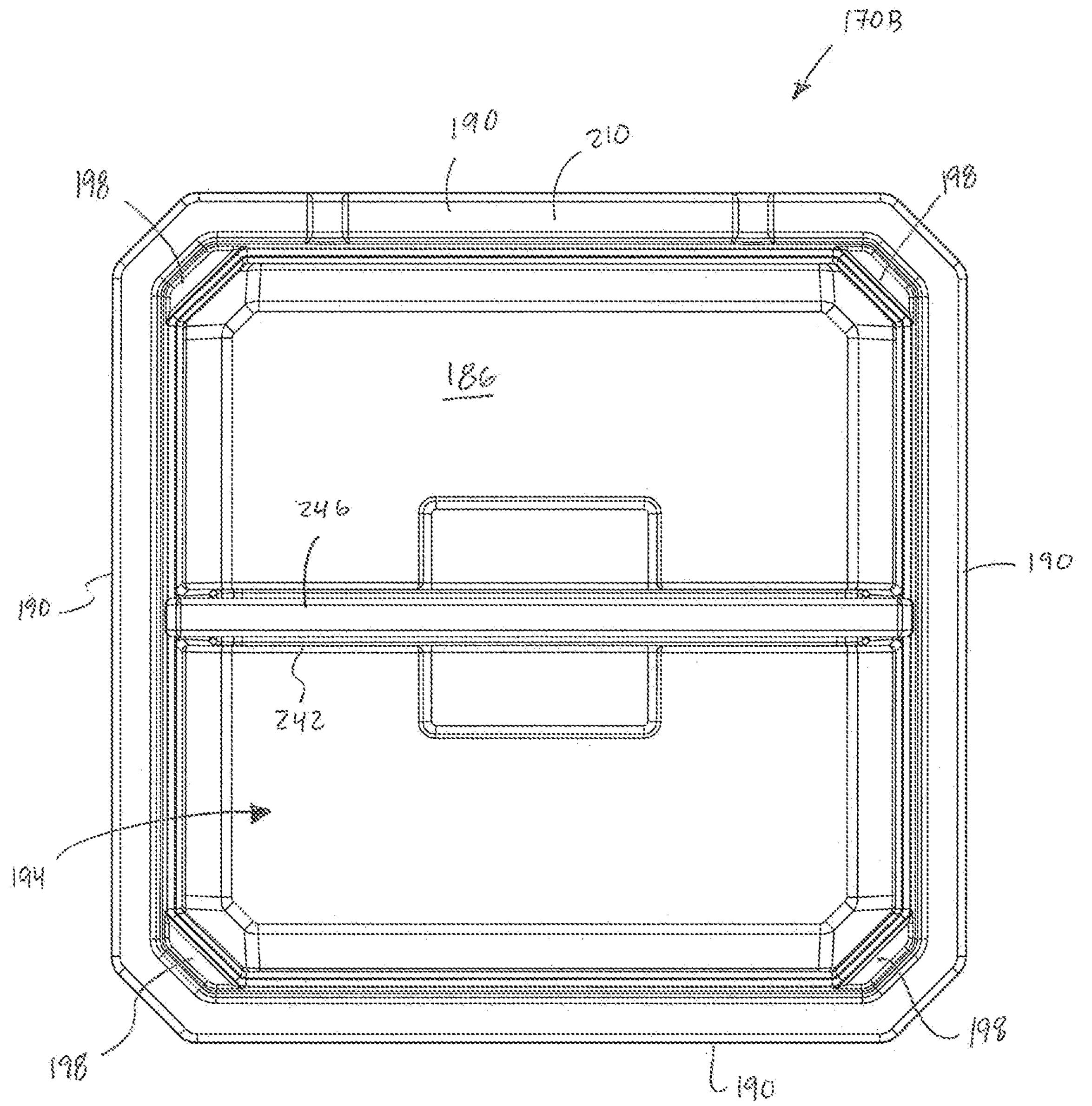
FIG. 13 is a top view of the bin of FIG. 12.

As shown in FIG. 11, a plurality of bins 170A, 170B, or inserts, are positioned within the base 114. The base 114 includes a bottom wall 172 and sidewalls 174 extending from the bottom wall defining an interior 176 with a depth D. The bins 170A, 170B are independently removable from the storage case 18 when the storage case 18 is open (i.e., the cover 118 is in the open position), as shown in FIG. 11. The bins 170A, 170B include relatively tall, or deep, bins 170A (FIG. 18) and relatively short, or shallow, bins 170B (FIGS. 12-17). The illustrated bins 170A, 170B are generally composed of plastic, but may alternatively be made of other materials. Each of the illustrated bins 170A, 170B is generally square in shape when viewed from above (FIG. 13). In other embodiments, the bins 170A, 170B may have other shapes (e.g., triangular, octagonal, circular, etc.). In the illustrated embodiment, the bins 170A, 170B are arranged within the base 114 as a grid of six (i.e., three rows of two). In other embodiments, the base 114 may be shaped and sized to receive a larger or smaller number of bins, and/or the bins 170A, 170B may be arranged within the base 114 in other patterns.

Figure 14:
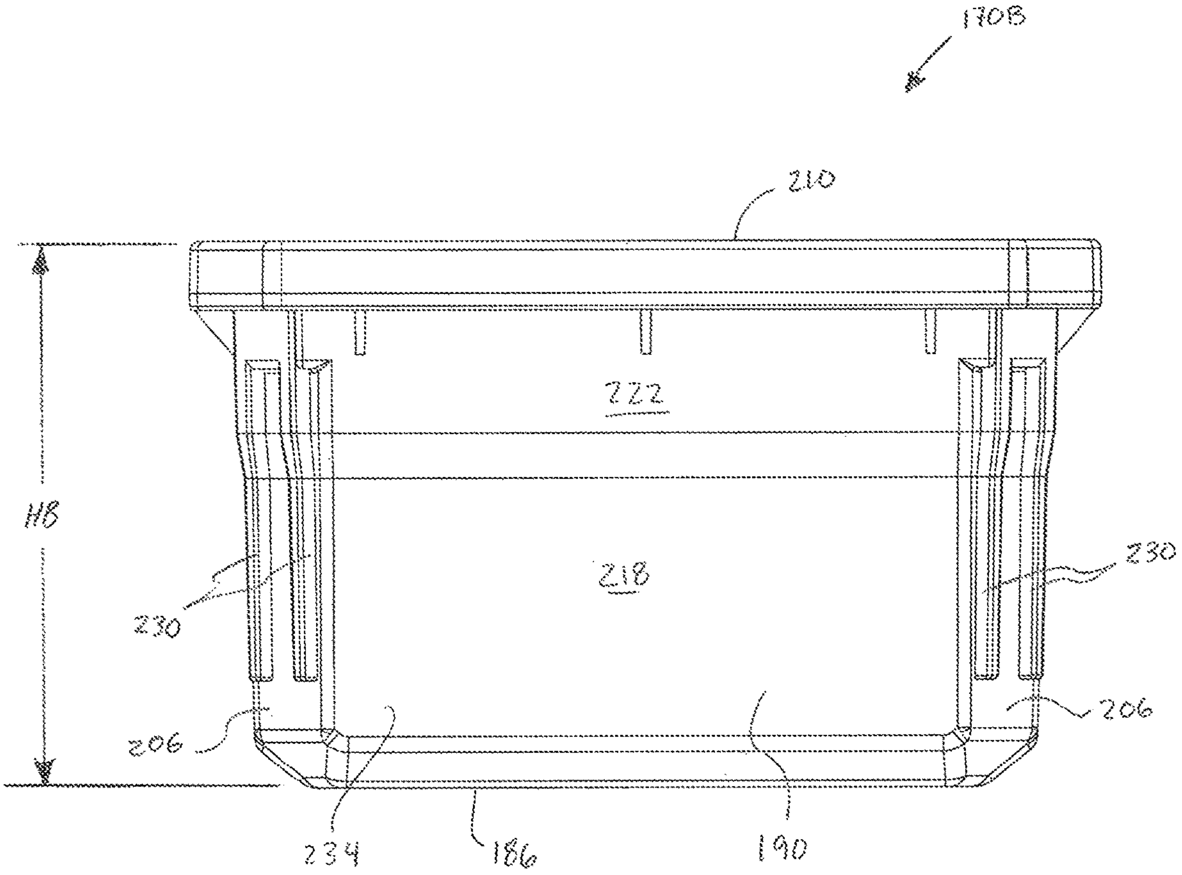
FIG. 14 is a side view of the bin of FIG. 12.
Figure 15:
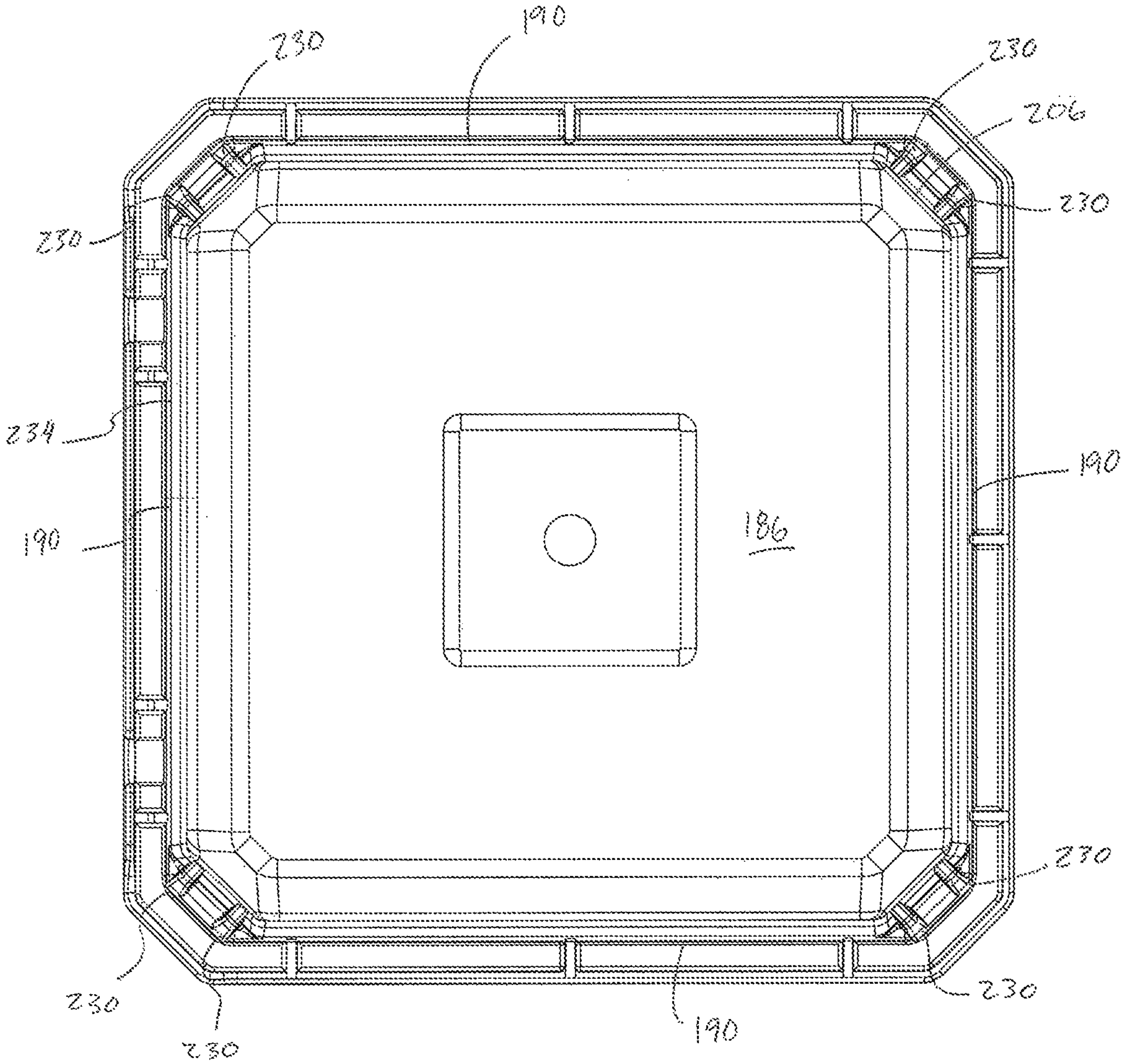
FIG. 15 is a bottom view of the bin of FIG. 12.

FIGS. 12-16 illustrate one of the relatively short bins 170B in detail. The bin 170B includes a bottom wall 186 and four sidewalls 190 extending generally perpendicularly from the bottom wall 186. The bottom wall 186 and the sidewalls 190 define a storage recess or space 194. Each of the relatively short bins 170B has a height HB (FIG. 14).

Figure 17:
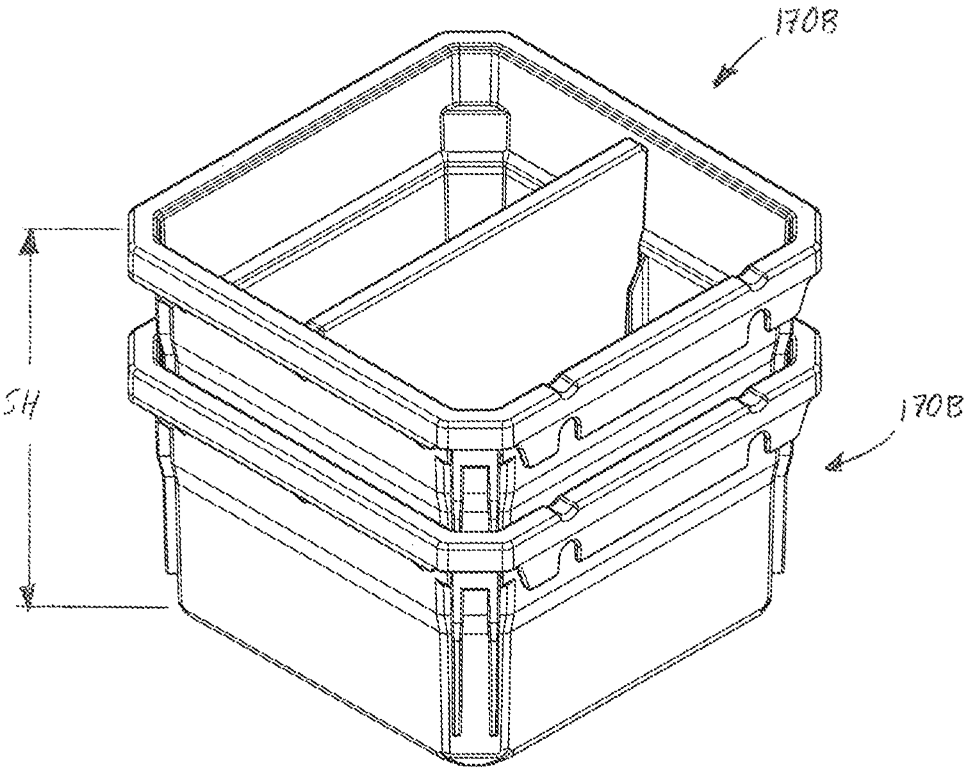
FIG. 17 illustrates two relatively short bins stacked on top of one another.

The bin 170B also includes ledges 198 formed on an inner surface 202 of the bin 170B at each corner 206 between adjacent sidewalls 190. The ledges 198 are positioned at a depth below a top edge 210 of the sidewalls 190 and a height above the bottom wall 186. In the illustrated embodiment, the ledges 198 are located at a depth that is approximately a quarter of the height HB below the top edge 210. In some embodiments the ledge 198 may extend around the perimeter of the sidewalls 190. The ledges 198 are configured to engage and support another bin when, for example, two relatively short bins 170B are stacked together, as best shown in FIG. 17. The bottom wall 186 at each corner 206 of the upper bin 170B is supported on each ledge 198 of the lower bin 170B. Each of the sidewalls 190 includes a lower, first portion 218 and an upper, second portion 222 that are stepped such that the first portion 218 has a smaller outer dimension than the second portion 222. As such, the sidewalls 190 of the upper bin 170B are partially received in the storage space 194 of the lower bin 170B up to the ledges 198 of the lower bin 170B. When stacked, the two relatively short bins 170B have a stacked height SH (FIG. 17). In other embodiments, more than two bins 170B may be stacked. Due to the top bin 170B being partially received in the bottom bin 170B, the stacked height SH is less than the total height of the two bins 170B (i.e., two times the height HB of the bins 170B).

The bin 170B further includes ribs 230 formed on an outer surface 234 of the bin 170B at the corners 206 between adjacent sidewalls 190. Each of the ribs 230 protrudes outwardly from the outer surface 234 and extends down from the top edge 210 toward the bottom wall 186. In the illustrated embodiment, each of the corners 206 has two ribs 230. In some embodiments, ribs may be formed on the sidewalls 190 between the corners 206 in addition to or in place of the ribs 230 formed at the corners 206.

Figure 19:
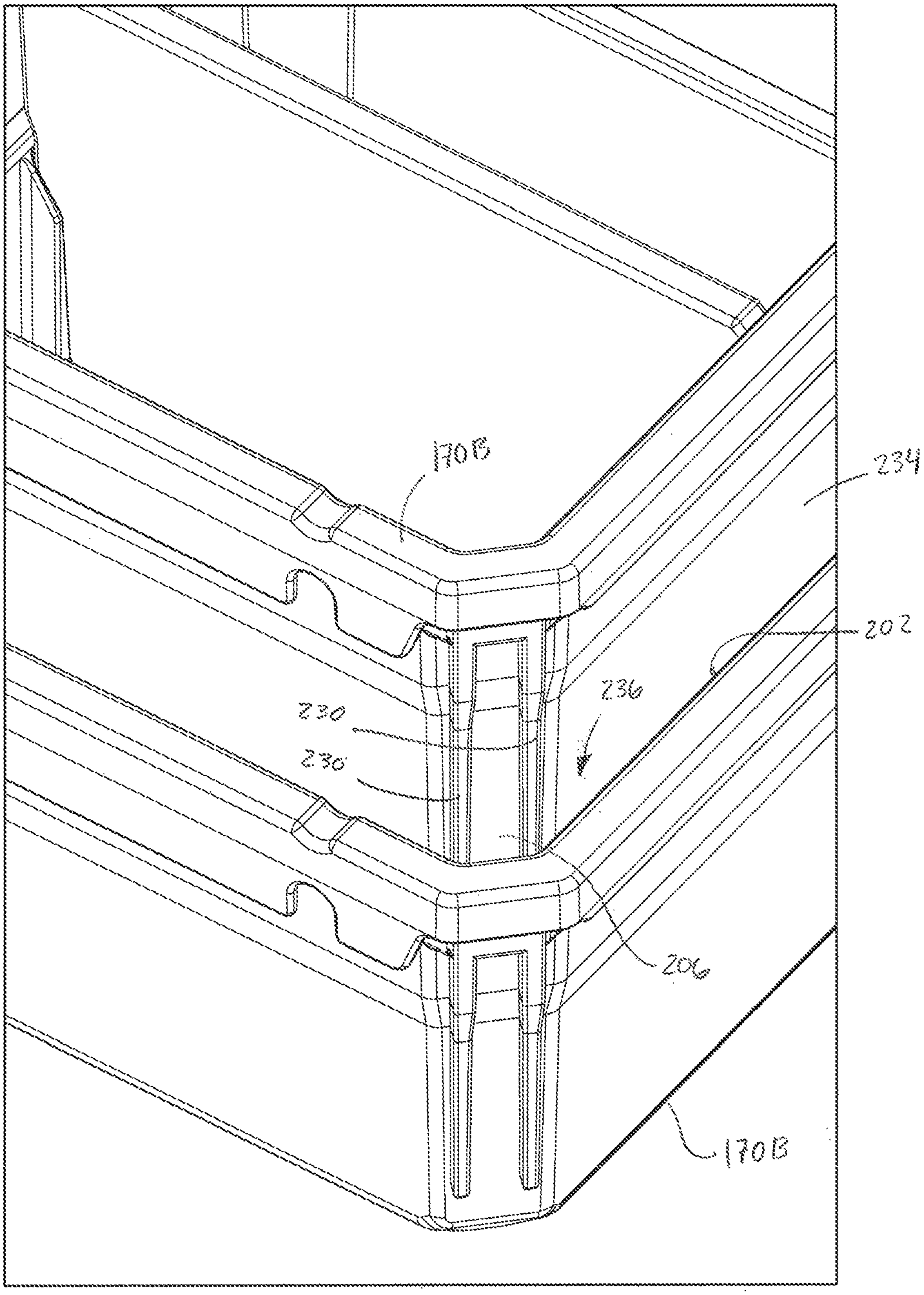
FIG. 19 is an enlarged view of portions of the two relatively short bins of FIG. 17 stacked together.

As best shown in FIG. 19, when two or more bins 170B are stacked, the ribs 230 protrude from the outer surface 234 of the upper bin 170B to contact and engage the inner surface 202 of the lower bin 170B to space apart the sidewalls 190 of the stacked bins 170B. Accordingly, the ribs 230 help maintain a space or gap 238 between the stacked bins 170B for airflow, thereby inhibiting the stacked bins 170B from getting stuck together due to vacuum effects. In other words, the gap 238 provides fluid communication between a cavity formed between the inner surface 202 of the lower bin 170B and the outer surface 234 of the bin 170B below the ledge 198 of the lower bin 170B and atmosphere, thereby inhibiting a vacuum from forming when the bins 170B are stacked.

Figure 16:
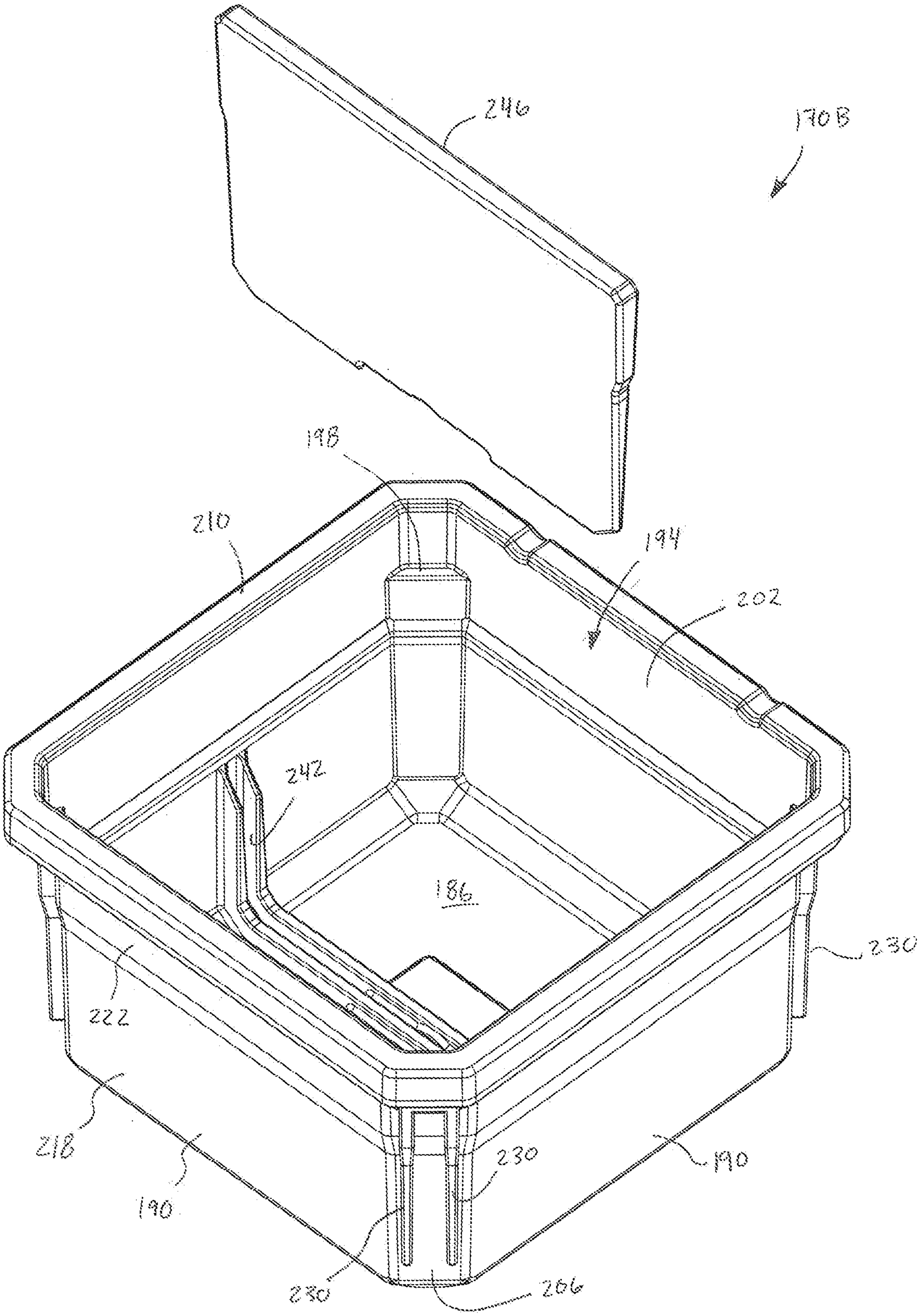
FIG. 16 is an exploded perspective view of the bin of FIG. 12.

In some embodiments, such as the illustrated embodiment, the bin 170B includes a track 242 formed on the inner surface 202 of the bin 170B, as best shown in FIG. 16. The track 242 extends partially along two opposing sidewalls 190 and along the bottom wall 186. The track 242 is configured to removably receive a dividing wall 246, or partition, for dividing the storage space 194 into separate compartments. The illustrated dividing wall 246 splits the storage space 194 in half. In other embodiments, the track 242 and the dividing wall 246 may be positioned to split the storage space 194 into unequally sized compartments, or the bin 170B may include multiple tracks for receiving multiple dividing walls. In some embodiments, the track 242 and the dividing wall 246 may be omitted. In the illustrated embodiment, the height of the dividing wall 246 inhibits a bin 170B from being stacked on a bin 170B with a dividing wall 246. In other embodiments, the dividing wall 246 may have a height that does not interfere with stacking the bins 170B.

Figure 18:
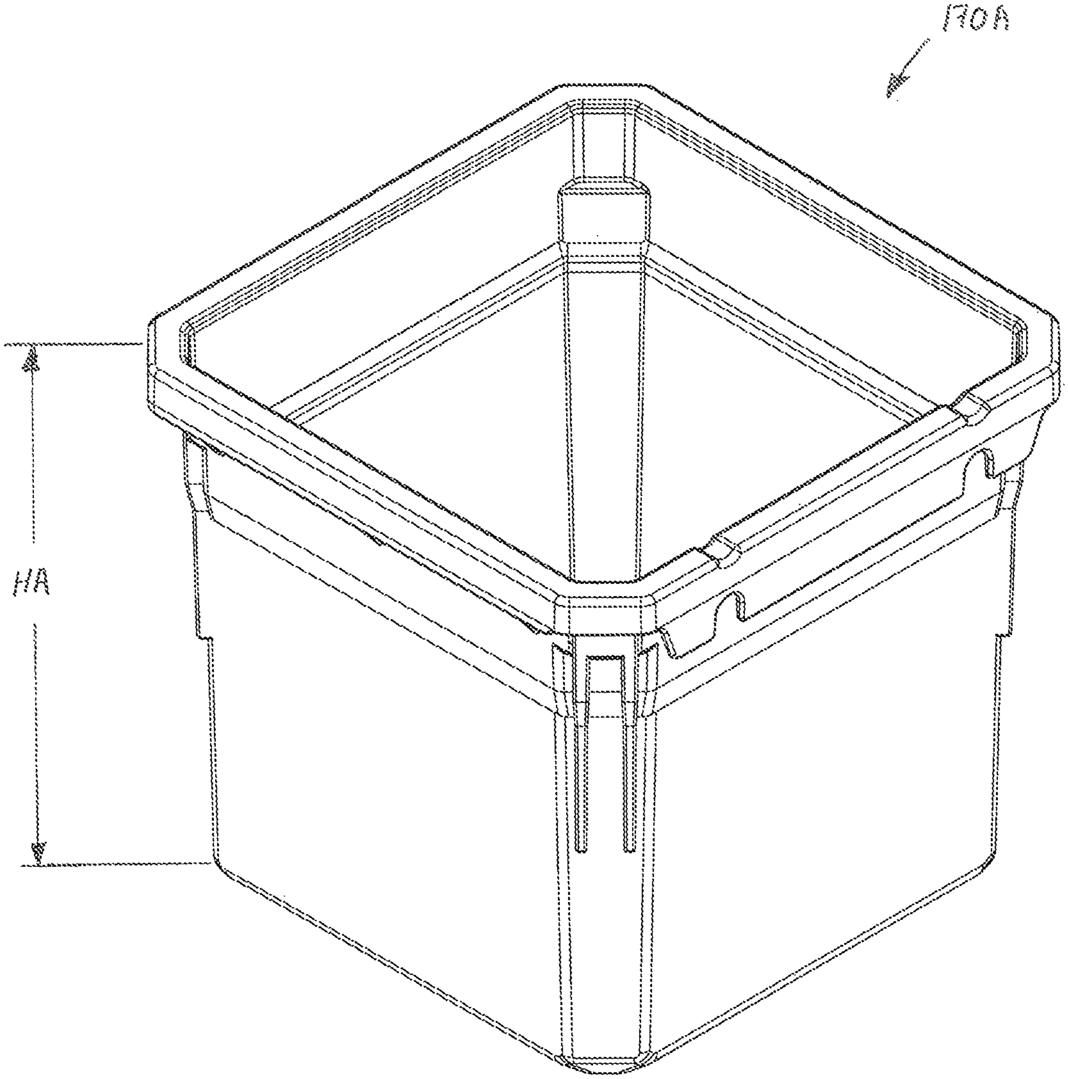
FIG. 18 illustrates a relatively tall bin.

FIG. 18 illustrates one of the relatively tall bins 170A. The relatively tall bin 170A is substantially similar to the relatively short bins 170B. However, the relatively tall bin 170A has a height HA greater than the height HB of the relatively short bin 170B. The stacked height SH of two relatively short bins 170B, when stacked together, is generally equal to the height HA of the relatively tall bin 170A. In addition, the height HB of the one relatively tall bin 170A and the stacked height SH of two relatively short bins 170B stacked together are each generally equal to the height or depth D of the base 114 of the storage device 18.

Figure 20:
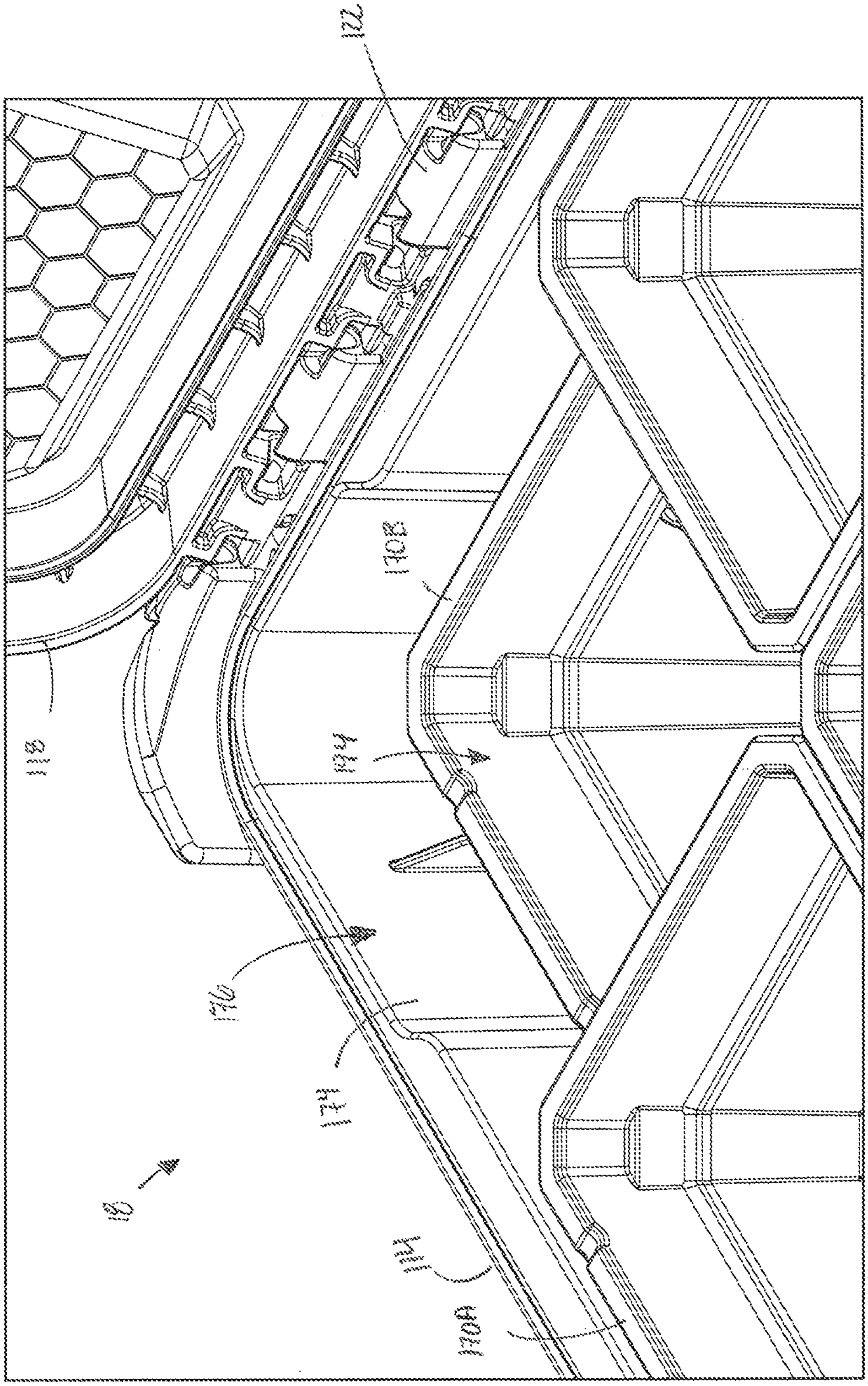
FIG. 20 is an enlarged view of a portion of the storage case in the open position.

As best shown in FIG. 20, a user may remove an upper bin of two stacked relatively short bins 170B within the base 114 of the storage case 18 to allow access to the storage space 194 of the lower bin 170B. Accordingly, the stacked bins 170B within the storage device 18 provide additional storage and organizing space that can be easily reconfigured and arranged as necessary.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. A storage device system, comprising:
- a soft-sided storage device comprising:
  - flexible sidewalls;
  - a rigid bottom member coupled to the flexible sidewalls, the flexible sidewalls and the rigid bottom member collectively defining a storage compartment; and
  - a rigid bottom surface defined by the rigid bottom member; and
- a rigid storage device comprising:
  - an upper surface; and
  - a plurality of connection recesses, each connection recess of the plurality of connection recesses comprising a first wing extending in a first direction and a second wing extending in a second direction opposite the first direction, the first wing and the second wing each offset and extending above a lower surface of the respective female coupler, the first wing and the second wing configured for arresting engagement with the rigid bottom surface of the soft-sided storage device, each of the first wing and the second wing defining a surface that faces downward towards and is parallel to a recessed surface of the respective connection recess.

2. The storage device system of claim 1, the plurality of connection recesses comprising two rows of connection recesses each parallel to a front of the rigid storage device, wherein each of the two rows of connection recesses comprises two connection recesses of the plurality of connection recesses.

3. The storage device system of claim 2, comprising a handle coupled to the front of the rigid storage device.

4. The storage device system of claim 1, comprising a latch assembly operable to secure the soft-sided storage device and the rigid storage device together, the latch assembly actuating between a locked configuration and an unlocked configuration, wherein the latch assembly obstructs movement of the rigid storage device relative to the soft-sided storage device when in the locked configuration.

5. The storage device system of claim 4, the latch assembly comprising:
- a locking aperture defined by the upper surface of the rigid storage device;
- a latch member coupled to the soft-sided storage device, the latch member configured to be received in the locking aperture; and
- a biasing element that biases the latch member into the locking aperture when the rigid storage device and the soft-sided storage device are coupled together in the locked configuration.

6. The storage device system of claim 1, the plurality of connection recesses comprising a first connection recess configured to engage with two distinct projections extending from the rigid bottom surface of the soft-sided storage device.

7. A storage device system, comprising:

a soft-sided storage device including a rigid bottom;

a rigid storage device including a top that interfaces with the bottom of the soft-sided storage device; and a latch assembly operable to secure the soft-sided storage device and the rigid storage device together, the soft-sided storage device and the rigid storage device being carryable as a coupled unit;

wherein one of the bottom or the top includes a projection and the other of the bottom or the top defines a recess configured to receive the projection, and wherein the projection is configured to engage the other of the bottom or the top defining the recess to interface the rigid storage device and the soft-sided storage device, and wherein the projection defines two channels arranged to receive and engage two wings formed by the other of the bottom or the top defining the recess, and wherein a first channel of the two channels is defined at least in part by a first projection portion extending from the projection, the first projection portion defining a first surface that faces towards and is parallel to one of the bottom or the top, and wherein a first wing of the two wings defines a second surface that faces towards and is parallel to the other of the bottom or the top, the first surface and the second surface interfacing when the soft-sided storage device and the rigid storage device are secured together.

8. The storage device system of claim 7, wherein the latch assembly includes a latch member supported on one of soft-sided storage device or the rigid storage device, and wherein the latch member is configured to selectively engage a latch aperture defined by the other of the soft-sided storage device or the rigid storage device to secure the soft-sided storage device and the rigid storage device together.

9. The storage device system of claim 8, wherein the channels receive the wings in a first direction and inhibits the soft-sided storage device from being disconnected from the rigid storage device except in a second direction opposite the first direction, and wherein the latch member engages the latch aperture to inhibit movement of the projection relative to the wings in the second direction.

10. The storage device system of claim 9, wherein the first and second directions are parallel to a top surface of the top.

11. The storage device system of claim 8, wherein the latch assembly includes a biasing member arranged to bias the latch member into engagement with the latch aperture when the rigid storage device and the soft-sided storage device are connected.

12. The storage device system of claim 7, wherein the soft-sided storage device further includes a handle, and wherein the coupled unit of the soft-sided storage device and the rigid storage device are carryable by the handle.

13. The storage device system of claim 12, wherein the handle is positioned above a center of gravity of the coupled unit of the soft-sided storage device and the rigid storage device.

14. A storage device system, comprising:

a rigid storage device comprising an upper surface; and a soft-sided storage device comprising:

flexible sidewalls;

a rigid bottom member coupled to the flexible sidewalls, the flexible sidewalls and the rigid bottom member collectively defining a storage compartment; and a rigid bottom surface defined by the rigid bottom member; and a plurality of projections extending from the rigid bottom surface, each of the plurality of projections comprising a first projection portion extending from the projection in a first direction and a second projection portion extending from the projection in a second direction opposite the first direction, the first projection portion and the second projection portion each offset and extending below the rigid bottom surface, the first projection portion and the second projection portion configured for arresting engagement with the upper surface of the rigid storage device, each of the plurality of projections defining a first channel between the first projection portion and the rigid bottom surface and a second channel between the second projection portion and the rigid bottom surface, each of the first projection portions and the second projection portions defining a surface that faces upward towards and is parallel to the rigid bottom surface.

15. The storage device system of claim 14, the rigid bottom member extending along a longitudinal axis, each of the first channel and the second channel extending parallel to the longitudinal axis of the rigid bottom member.

16. The storage device system of claim 14, comprising a latch assembly operable to secure the soft-sided storage device and the rigid storage device together, the soft-sided storage device and the rigid storage device being carryable as a coupled unit.

17. The storage device system of claim 12, the latch assembly comprising:

a latch member coupled to the soft-sided storage device; and a locking aperture defined by the upper surface of the rigid storage device, the locking aperture configured to receive the latch member, wherein the latch assembly obstructs movement of the rigid storage device relative to the soft-sided storage device when the latch member is received in the locking aperture.

18. The storage device system of claim 17, the plurality of projections comprising two rows of projections each parallel to a front of the soft-sided storage device, wherein each of the two rows of projections comprises two projections of the plurality of projections.

* * * * *